(12) United States Patent
King et al.

(10) Patent No.: US 7,925,470 B2
(45) Date of Patent: Apr. 12, 2011

(54) NOVELTY DETECTION

(75) Inventors: Dennis M King, Derby (GB); David Clifton, Newmarket (GB); Lionel Tarassenko, Oxford (GB); Stephen P King, Derby (GB); Paul Anuzis, Derby (GB); Robert W Slater, Derby (GB)

(73) Assignees: Rolls-Royce, PLC, London (GB); Oxford Biosignals Limited, Abingdon (GB)

( * ) Notice: Subject to any disclaimer, the term of this patent is extended or adjusted under 35 U.S.C. 154(b) by 450 days.

(21) Appl. No.: 12/216,872

(22) Filed: Jul. 11, 2008

(65) Prior Publication Data

US 2009/0187381 A1 Jul. 23, 2009

(30) Foreign Application Priority Data

Jan. 18, 2008 (GB) .................................. 0800985.4

(51) Int. Cl.
*G06F 19/00* (2006.01)
(52) U.S. Cl. ...................................................... 702/181
(58) Field of Classification Search .................. 702/181, 702/182–185, 188
See application file for complete search history.

(56) References Cited

U.S. PATENT DOCUMENTS

| 7,415,390 B2 * | 8/2008 | Radulovic et al. ............. 702/189 |
| 2006/0074598 A1 * | 4/2006 | Emigholz et al. ............. 702/185 |
| 2007/0203653 A1 * | 8/2007 | Ben-Dor et al. ................ 702/19 |

* cited by examiner

*Primary Examiner* — Edward Raymond
(74) *Attorney, Agent, or Firm* — Oliff & Berridge, PLC

(57) ABSTRACT

A method and apparatus for detecting an abnormality in e.g. in operating characteristics or function of a machine, apparatus or system, the method including providing a data sample set comprising n values of a measured physical parameter associated with the apparatus or system generated by repeating a measurement of the physical parameter n times. An extremal measured parameter value is selected from amongst the data sample set, determining a probability of observing the selected parameter value (e.g. of observing a value not exceeding the selected parameter value) by applying the selected parameter value to an extreme value probability distribution function having a location parameter and a scale parameter. The value of the location parameter and the value of the scale parameter are each constructed using an integer value m (e.g. notionally representing the size of a sub-sample data set comprising m of said measured parameter values) in which m is less than n (i.e. m<n). A conditional indication is given that the selected parameter value is abnormal according to the value of the probability.

82 Claims, 8 Drawing Sheets

NOVELTY DETECTION

Figure 1:
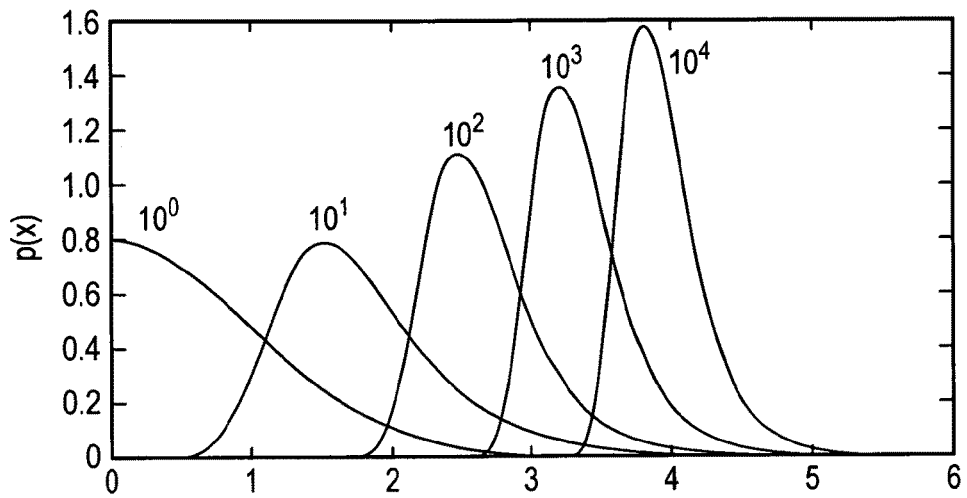

The present invention relates to apparatus and methods for detecting abnormalities (or "novelties") in a monitored apparatus of system using extreme values of physical parameter measurements associated with the apparatus or system.

The Central Limit Theorem describes the probability distribution function of the mean of a large number of i.i.d. (independent and identically distributed) random variables. When the number of i.i.d. variables observed is large, the probability distribution function of the mean approaches a Gaussian distribution, no matter what the parent distribution was. There is an analogous result for the maximum value of such i.i.d. variables, namely that the probability distribution function of the maximum value also will approach a limiting form.

The limiting distribution for the maximum can be estimated empirically by finding the maximum of a sample of random variables, repeating for many samples, and constructing a histogram. A larger sample size is likely to have a larger maximum, so the histogram would shift to higher values with increasing sample size.

Extreme value theory (EVT) is an area of statistics that models the distribution of extremely large or small values from a generative data distribution, effectively modelling the tails of that distribution.

In novelty detection, a model of normality is constructed from "normal" data, with significant deviations from that model classified "abnormal". This approach is particularly well-suited for data sets in which few examples of abnormal data are available in comparison to much larger quantities of normal data. Typical applications include the condition monitoring of high-integrity systems (such as gas-turbine engines), in which faults are rare in comparison with long periods of normal operation. Such systems are often highly complex, with many possible modes of failure. By modelling normal system behaviour, previously-unseen, or under-represented, modes of failure may be identified.

Consider a "normal" training set of m (m=integer) i.i.d. data, $X=\{x_1, x_2, \ldots x_m\}$, distributed according to some function $D(x)$, with maximum $x_{max}=\text{Max}(X)$. A distribution function may be defined for $x_{max}$ to be $H(x_{max} \leq x)$ which represents the belief in the value of the maximum of the m data drawn from distribution D (over the range of x) is modelled by H.

It can be shown that for H to avoid degeneration as m tends to infinity, it must converge according to the transform $$x_{max} = \sigma_m x + \mu_m$$

for some location parameter, $\mu_m$ (a real number), and scale parameter, $\sigma_m$ (a real positive number), and where the convergence is a weak convergence of distributions. Furthermore, for any underlying data distribution D, the limit distribution must take the normalised form:

$$H(x_{max} \leq x) = H\left(\frac{x - \mu_m}{\sigma_m}\right) = H(y_m)$$

where $y_m = (x - \mu_m)/\sigma_m$ is termed the "reduced variate".

According to the well known Fisher-Tippett theorem, H must belong to one of the following three families of extreme value probability distributions (EVD) derived from the Generalised Extreme Value distribution.

Type I (Gumbel):

$$H(y_m) = \exp(-\exp(y_m))$$

Type II (Frechet):

$$H(y_m) = 0 \text{ if } y_m \leq 0$$

$$H(y_m) = \exp(-y_m^{-\alpha}) \text{ if } y_m > 0$$

Type III (Weibull):

$$H(y_m) = \exp(-(-y_m)^{-\alpha}) \text{ if } y_m \leq 0$$

$$H(y_m) = 1 \text{ if } y_m > 0$$

Where the Frechet and Weibull distributions have a shape parameter $\alpha$, which is real positive.

Now consider data distributed according to the one-sided standard Gaussian $D \sim |N(0,1)|$, which converges to the Gumbel distribution for extreme values. The probability of observing some $x_{max}=x$, given the data, is $P(x_{max}=x|X)$, or $P(x|X)$ for simplicity, and is given by the Gumbel form:

$$P(x|X) = P(x|\theta) = H(y_m) = \exp(-\exp(y_m))$$

where model parameters $\theta = \{\mu_m, \sigma_m\}$ are the location and scale parameters from the reduced variate $y_m = (x - \mu_m)/\sigma_m$ and are derived from X. The associated probability density function is found by differentiation:

$$p(x|X) = p(x|\theta) = H'(y_m) = \sigma_m^{-1} \exp(-y_m - \exp(y_m)).$$

Note that, the "precision" is defined as $\lambda_m = \sigma_m^{-2}$. Classical EVT assumes that the location and scale parameters are dependent only upon the integer value m, and this has been verified via Monte Carlo simulation for m=2, ..., 1000. The location and scale parameters in this regard take the following form.

$$\mu_m = \sqrt{2\ln(m)} - \frac{\ln(\ln(m)) + \ln(4\pi)}{2\sqrt{2\ln(m)}}$$

$$\sigma_m = \frac{1}{\sqrt{2\ln(m)}}$$

FIG. 1 graphically illustrates a Gumbel Extreme Value probability Distribution (EVD) function for a variety of data sample set sizes (m). In FIG. 1 the distribution $D = |N(0,1)|$ is illustrated together with its corresponding EVDs for increasing m, using the Type I form with location and scale parameters computed as previously described. Note that the EVD for m=1 is given by the $|N(0,1)|$ distribution itself. The figure shows that as we draw larger numbers m of data from distribution D, the expected maximum of those m values increases. This corresponds to the intuition that we are more likely to see a larger maximum value if we draw more data from distribution D.

Figure 2:
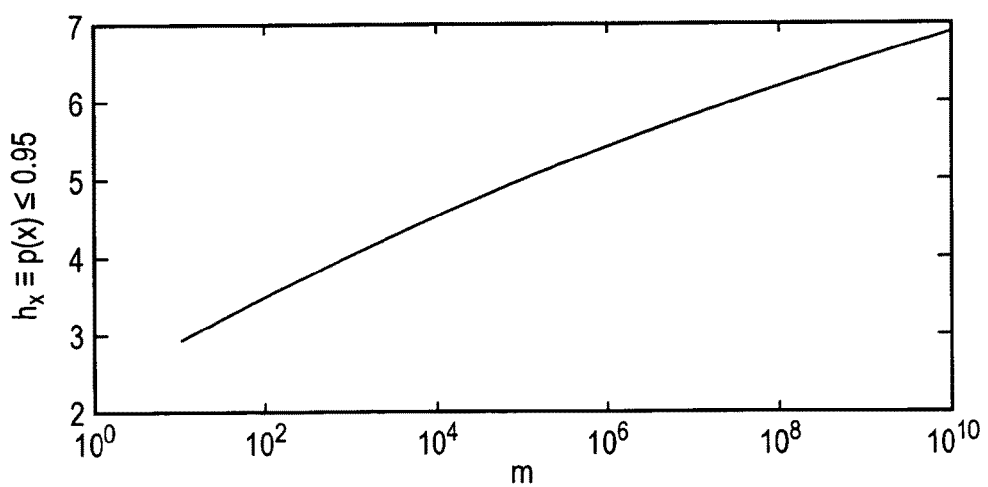

A novelty detection scheme must ultimately decide if a value x is "normal" or "abnormal", for which a decision boundary on x must be determined. This is the novelty threshold. FIG. 2 shows the novelty threshold $P(x|X)=0.95$ computed using the above Gumbel EVD for increasing values of m. FIG. 2 graphically illustrates the progression of the abnormality/novelty detection threshold defined using the Gumbel EVD of FIG. 1. Increasing the integer value m causes the novelty threshold to increase monotonically. That is, using classical EVT in this way, observing larger numbers of training data (drawn from the same distribution D) results in a higher novelty threshold.

For the purposes of illustration, consider the following example of data distributed according to an exponential probability distribution function. The cumulative distribution function for the exponential distribution is $$P(X \leq x) \equiv D(x) = 1 - e^{-x}$$

The cumulative distribution for the maximum, $x_{max} = \text{Max}\{x_1, \ldots, x_m\}$, is the probability that each of the m data values are less than x, thus $$P(x_{max} \leq x) \equiv [D(x)]^m = (1 - e^{-x})^m$$

If one finds the values for a location parameter and a scale parameter, one may transform the variable x to the reduced variate such that the distribution function for the reduced variate $y_m$ reaches a limiting form. In this example the suitable location parameter is ln(m), and the scale parameter is 1 (one). Thus $$H(y_m) \equiv P(x_{max} - \ln(m) \leq y_m)$$
$$\equiv [D(y_m + \ln(m))]^m$$
$$= \left(1 - \frac{e^{-y_m}}{m}\right)^m \xrightarrow[m \to \infty]{} \exp(-e^{-y_m})$$

The limiting distribution is Gumbel with a peak located at x=ln(m). The limiting distribution for the maximum can also be estimated empirically by finding the maximum of a sample of random variables having an unknown distribution, repeating for many samples, and constructing a histogram. The method of "maximum likelihood" is typically used to determine the scale and location of the EVD which maximize the probability of observing what was actually observed. For example, the probability density function associated with the Gumbel EVD is given by $$h(x) = H'(x) = \exp(-\exp(-(x-\mu_m)/\sigma_m)) \cdot \exp(-(x-\mu_m)/\sigma_m)) \cdot 1/\sigma z_m.$$

Given a data set $X = \{x_1, X_2, \ldots, x_m\}$ of independently observed maxima $x_i$ one may state that the likelihood (L) of observing the data set is $$L(X = \{x_1, x_2, \ldots, x_m\}) = \prod_{i=1}^{m} h(x_i),$$

which is known as the "likelihood function". The scale and location parameters of the Gumbel distribution may be determined to be those which maximise this likelihood function.

The methods described above are those in which classical EVT has been used for novelty detection to date. However, it results in the counter-intuitive behaviour that the novelty detection system will be at its most sensitive (i.e., it will have the lowest novelty threshold) when only small numbers of training data have been observed. As more data are observed (and m increases), this novelty detection system will become less sensitive (i.e., its novelty threshold will increase).

The invention aims to provide methods and apparatus which may be used to address the limitations discussed above.

The invention, in one of its aspects is based on a realisation that, in applying the size of the main/whole data sample set of all acquired measurement values in constructing an Extreme Value probability Distribution function (EVD), previous approaches to using classical EVT for novelty detection prove inappropriate for setting a decision boundary to classify between normal and abnormal data. Conversely, the invention, in this aspect, applies an EVD in novelty detection using the size of a sub-sample data set notionally drawn from the main data sample set of measured physical parameter values. As a result, the location of the EVD does not inherently shift to ever increasing values as more physical parameter values are measured during the monitoring of the apparatus/system in question. Consequently, the detection threshold, defined using the EVD, does not also inherently shift to higher and higher values (i.e. become increasingly conservative) as has been characteristic of existing applications of EVDs in novelty detection.

Accordingly, in a first of its aspects, the invention may provide a method for detecting an abnormality in (e.g. in operating characteristics or function of the apparatus/system) an apparatus or system including:

providing a data sample set comprising n values of a measured physical parameter associated with the apparatus or system generated by repeating a measurement of the physical parameter n times;

selecting an extremal measured parameter value from amongst the data sample set;

determining a probability of observing the selected parameter value (e.g. of observing a value not exceeding the selected parameter value) by applying the selected parameter value to an extreme value probability distribution function having a location parameter and a scale parameter wherein the value of the location parameter and the value of the scale parameter are each constructed using an integer value m (e.g. notionally representing the size of a sub-sample data set comprising m of said measured parameter values) in which m is less than n (i.e. m<n);

conditionally indicating that the selected parameter value is abnormal according to the value of said probability.

The integer m notionally represents the number of elements of a sub-sample data set drawable from the data sample set of n elements.

The extreme value probability distribution function may be a cumulative probability distribution function, and the probability of observing the selected parameter value may be determined by applying the selected value directly to the extreme value probability distribution function to determine a probability of observing a value not exceeding the selected parameter value. The extreme value probability distribution function may be an integral of a probability density function integrated between two limits one of which (upper limit or lower limit) is the selected parameter value.

The step of conditionally indicating an abnormal parameter value may include comparing the probability of observing the selected parameter value to a predetermined threshold value, and so indicating on condition that the probability value exceeds the threshold value. For example, the threshold value may be a threshold probability value from, or between, 0.95 and 1.0 to which the cumulative probability of observing a value not exceeding the selected parameter value is compared.

The indication may preferably be visible, and/or audible. Preferably the indication includes a graphical indication of abnormality. The indication may take the form of an alarm signal or warning.

It has been found that the frequency distribution of values of data in a said sub-sample data set (if or when drawn from the data sample set) often tends to better approximate a Gaussian distribution than does the main data sample set. It has been found that the degree of approximation may depend upon the number (m) of data sub-samples drawn (i.e. the size of the sub-sample data set), and an appropriate sub-sample size (integer m) may be selected to optimize this approximation. The better a data set approximates a Gaussian distribution, the better the assumption that extreme values drawn from that data set will be distributed according to a single EVD. Consequently, use of an appropriate value (integer m) in constructing the EVD results in a more appropriate form (e.g. location and scale) of EVD. The distribution of the m measured parameter values may approximate a Gaussian distribution more closely than the distribution of the values of such a sub-sample data set of a different size, and preferably of any different size. Selection of an appropriate size of the sub-sample set may be conducted by trial and error on a case-by-case basis to identify the optimal sub-sampling scheme and sub-sample set size (m).

For example, preferably the sub-sample data set may include the extremal value. The measured parameter values of a sub-sample data set of size m comprising m of the n measured parameter values, and including the extremal value, preferably conform to a distribution (e.g. frequency distribution, histogram etc) which approximates a Gaussian distribution more closely than that of such a sub-sample set of a (or any) different size. The sub-sampling regime may involve sampling from different or disparate parts of the data sample set in addition to drawing the extremal value. It has been found that sub-sampling by selecting the highest m values (i.e. the maximum/highest value, the next highest, the next highest after that . . . and so on until m samples are drawn), or lowest m values (i.e. the minimum/lowest value, the next lowest, the next lowest after that, and so on until m samples are drawn), of the data sample set provides an effective sub-sampling regime in this regard. Each of the measured parameter values of the sub-sample data set may be greater in value than any measured parameter value of the data sample set not also comprised in the sub-sample data set. Once a sub-sampling regime has identified the suitable value (m) for the sub-sample data set size for use in defining the EVD, further sub-sampling need not be undertaken in respect of novelty detection on the apparatus or system to be monitored since the EVD has been defined.

The extreme value probability distribution (EVD) function may be a Gumbel (Type I) distribution of the form:

$$H(y_m) = \exp(-\exp(y_m))$$

where $$y_m = \frac{x - \mu_m}{\sigma_m}$$

and x is the extremal data value, $y_m$ is the "reduced variate", $\mu_m$ is the location parameter of the EVD, and $\sigma_m$ is the scale parameter of the EVD. The subscript m denotes that the location and scale parameters are determined using the integer value m. Thought a Type II (Frechet) or Type III (Weibull) EVD may be employed, the Type I (Gumbel) EVD is particularly suitable when the data from which the extremal value is drawn in distributed according to a distribution approximating a Gaussian form.

The extremal value may be the maximum value (e.g. Max $[x_1, \ldots, x_j]$ of the data set $\{x_1, \ldots, x_j\}$ of j values x), or the minimum value (e.g. Min$[x_1, \ldots, x_j]$ of the data set $X = \{x_1, \ldots, x_j\}$ of j data values x), of the data sample set. The methods applied to determining the probability of observing a minimum value may include the initial step of transforming each of the data sample values of the data sample set (or sub-sample data set) by changing the sign thereof, without changing the magnitude thereof, such that a positive original value $x_i$ is transformed into a negative value $z_i$ of the same magnitude and a negative original value $x_i$ is transformed into a positive value $y_i$ of the same magnitude. That is to say: $z_i = -x_i$; for i=1 to j. Consequently, small (e.g. minimum) values in the set X of original data values correspond to large (e.g. maximum) values in the set Z ($Z = \{z_1, \ldots, z_j\}$) of transformed data values. Thus, Max$[z_1, \ldots z_j]$=Min$[x_1, \ldots x_j]$. The methods described herein, in any aspect of the invention, may then be applied to determining the probability of observing the value Max$[z_1, \ldots z_j]$ for the purposes of conditionally indicating whether the value in question is abnormal.

The method may include constructing the location parameter ($\mu_m$) of the extreme value probability distribution function according to the following equation:

$$\mu_m = \sqrt{2\ln(m)} - \frac{\ln(\ln(m)) + \ln(4\pi)}{2\sqrt{2\ln(m)}}$$

The location parameter value ($\mu_m$), when employed in an EVD representing a minimum extremal value, may be constructed according to the following equation:

$$\mu_m = -\sqrt{2\ln(m)} + \frac{\ln(\ln(m)) + \ln(4\pi)}{2\sqrt{2\ln(m)}}$$

The method may include constructing the scale parameter ($\sigma_m$) of the extreme value probability distribution function according to the following equation:

$$\sigma_m = \frac{1}{\sqrt{2\ln(m)}}$$

The value (m) (e.g. the size of the sub-sample data set) may be a value selected from following integers: 3 to 10. The value (m) may be 3, or 4, or 5 (m=3, or m=4, or m=5).

The method may include repeating n (n=integer) times a measurement of a physical parameter associated with the apparatus or system thereby to generate said data sample set comprising said n measured parameter values.

The invention, in one of its aspects, at its most general, proposes applying EVT to novelty detection in an apparatus or system within a framework which quantifies, and accounts for, uncertainty in the representation of the distribution of the extreme values of observed data values acquired from the apparatus being monitored. For example, a recursive Bayesian uncertainty framework may be employed to enable the quantification of uncertainty to be modified, or updated, as more data values are acquired from the system being monitored.

In a second of its aspects, the invention may provide a method for detecting an abnormality in (e.g. in operating characteristics or function of the apparatus/system) an apparatus or system including:
  providing a data sample set comprising a plurality of values of a measured physical parameter associated with the apparatus or system generated by repeating a measurement of the physical parameter a plurality of times;
  selecting an extremal measured parameter value from amongst the sample set;
  determining a probability of observing the selected parameter value (e.g. of observing a value not exceeding the selected parameter value) by applying the selected parameter value to a probability distribution function comprising a weighted sum of a plurality of extreme value probability distribution functions each having a location parameter and a scale parameter wherein the value of the location parameter and the value of the scale parameter are determined according to an estimation of the probability thereof;

conditionally indicating that the selected parameter value is abnormal according to the value of said probability of observing the selected parameter value (e.g. by comparing the probability of observing the selected parameter value to a novelty threshold). The value of the weight associated with a given extreme value probability distribution function in said weighted sum may be determined according to the estimation. The method, in the second aspect of the invention, may include repeating a plurality of times a measurement of a physical parameter associated with the apparatus or system thereby to generate said data sample set comprising said plurality of measured parameter values.

This represents constructing and applying a representation of normality in the apparatus or system being monitored (i.e. the measured physical parameter values one would expect to see under "normal" circumstances). It incorporates a representation of uncertainty in that representation in the form of the weighted sum of EVDs. The structure (e.g. location and scale) of each such EVDs determines its weighting within the weighted sum. Conversely, existing methods employ a single EVD and, therefore, no account is taken of uncertainty in the assumption that the form or structure of that single EVD is accurate or correct.

When small numbers of data samples have been observed in the apparatus/system being monitored, uncertainty in a representation of normality in the apparatus or system will generally be at its highest, and so the invention in its second aspect may provide an insensitive (high) novelty threshold to avoid making false-positive "abnormal" classifications. That is, for small data sample set sizes, the novelty threshold may be at its highest.

Similarly, as more data samples are observed which, by definition, tend to be of the "normal" variety, uncertainty in the representation of normality decreases, and so allowance can be made for a more sensitive novelty threshold. That is, for increasing data sample set sizes, the novelty threshold may decrease.

In existing methods, a data sample set is assumed to be generated from the maximum likelihood (ML) distribution, as discussed above, of the form $X \sim |N(\mu_{ML}, \lambda_{ML})|$. However, this could be (and often is) a poor estimate of the true underlying data-distribution D, particularly for small data sample set sizes. However, observing more data should not necessarily cause an increase in the novelty threshold. Rather, it should only increase the certainty in the estimate of D, which may allow us to decrease the novelty threshold from some initial (prior) conservative estimate.

This is provided for in this aspect of the invention by considering that the data could have been generated by a range of different distributions, not just the ML distribution. That is, rather than assume that the data are distributed $|N(\mu, \lambda)|$, where $\mu = \mu_{ML}$, $\lambda = \lambda_{ML}$, and using only that ML distribution to construct the EVD, the invention in this aspect may consider multiple, or all possible, $\theta = (\mu, \sigma)$ pairs (location parameter, scale parameter) to give an overall EVD. The method may include constructing an overall EVD $p(x|X)$ by integrating over all candidate location and scale parameter pairs $\theta$:

$$p(x|X) = \int p(x|\theta)p(\theta|X)d\theta$$

$$= \int_{-\infty}^{\infty} \int_{0}^{\infty} p(x|\mu, \lambda)p(\mu, \lambda|X)d\mu d\lambda$$

The first integrand of the above expression (the EVD given model parameters $\theta$) is given by $$p(x|\theta) = H'(y_m) = \sigma_m^{-1} \exp(-y_m - \exp(y_m)) = \sqrt{\lambda_m} \exp(-y_m - \exp(y_m))$$

for a Gumbel EVD, for example, where the precision $\lambda_m = 1/\sigma_m^2$. The second integrand represents of an estimation of uncertainty in the parameters $\theta$.

The method may include generating the estimation using a plurality of measured physical parameter values from the data sample set to recursively update a prior such estimation. For example, the invention in this aspect may set classical EVT within a Bayesian framework, to quantify uncertainty in the representation of D, and thus providing a method of overcoming the disadvantages discussed above.

Given the observed data set X, according to the invention in this aspect, one may define a probability distribution over the candidate parameters $P(\theta|X)$ modelling the belief that $\theta$ are the true parameters of the underlying data distribution D. By definition, the ML pair $\theta = \theta_{ML}$ will be the peak of this probability distribution, but, particularly for lower data set sizes, other pairs $\theta$ may have a significant probability of being the true parameters of D.

The second integrand in the aforementioned probability $$p(x|X) = \int p(x|\theta)p(\theta|X)d\theta$$

$$= \int_{-\infty}^{\infty} \int_{0}^{\infty} p(x|\mu, \lambda)p(\mu, \lambda|X)d\mu d\lambda$$

is the joint distribution $p(\mu, \lambda|X)$. Bayes' theorem may be exploited in this aspect of the invention to express the joint distribution $p(\mu, \lambda|X)$ as a posterior distribution. For example, the joint distribution $p(u, \lambda|X)$ may be expressed in terms of a likelihood distribution $p(X|\mu, \lambda)$, such as a Gaussian likelihood distribution or other suitable likelihood distribution, and a prior estimate $p(\mu_0, \lambda_0)$ of the parameters $(\mu_0, \lambda_0)$:

$$p(\mu, \lambda|X) \propto p(X|\mu, \lambda)p(\mu_0, \lambda_0)$$

which can be expanded to give a recursive Bayesian update equation after observing m data:

$$p(\mu_m, \lambda_m | x_1, \ldots, x_m) \propto p(x_m | \mu_{m-1}, \lambda_{m-1}) p(\mu_{m-1}, \lambda_{m-1} | x_1, \ldots, x_{m-1})$$

The method may include generating a joint posterior probability distribution function comprising the product of a first component probability distribution function for the value of the location parameter, and a second component probability distribution function for the value of the scale parameter, and generating said estimation using the joint posterior probability distribution function.

For example, in order for the posterior of iteration m−1 of the above recursive Bayesian update equation to be used as the prior for iteration m, its functional form must be reproducing: that is to say after multiplication with the likelihood, the prior must have the same functional form as the posterior. This is a conjugate prior.

For example, when the data likelihood is Gaussian, and λ is known, it can be shown that the conjugate prior p(μ|X) is also Gaussian $\sim N(\mu|\mu_0, [\lambda_0]^{-1})$. Similarly, if μ is known, it can be shown that the conjugate prior p(λ|X) is the Gamma distribution, $Gam(\lambda|a_0,b_0)$ with hyper-parameters for the shape $a_0$, and scale $b_0$. With both μ and λ unknown, the conjugate prior is Normal-Gamma:

$$p(\mu,\lambda)=N(\mu|\mu_0,[\beta_0\lambda]^{-1})Gam(\lambda|a_0,b_0)$$

Generally, we may write $p(\mu,\lambda)=p(\mu|\lambda)p(\lambda)$, which by comparison with the above example, shows that the conjugate prior has:

mean μ which has a Gaussian distribution for which the precision is a function of λ, and precision λ which has a Gamma distribution.

The method may include selecting a plurality of the measured parameter values from amongst the data sample set and generating a value for a hyper-parameter of the joint posterior probability distribution function using the measured values so selected. The method may include generating the aforesaid estimation using a previous or prior such estimation, and/or may include generating the estimation using a plurality of measured physical parameter values from one or more independent other data sample set(s) and which each comprise(s) a plurality of values of said physical parameter generated by repeating said measurement of said physical parameter a corresponding plurality of times.

The method may include generating a value for a hyper-parameter of the joint posterior probability distribution function using an integer value j representing the size of a sample data set comprising j of the measured parameter values of the data sample set. The integer value j may be less than the integer value n (i.e. j<n) representing the size of the data sample set, and the sample data set may be a sub-sample data set. The method may include generating the value of each hyper-parameter using the integer value j.

A hyper-parameter of the joint posterior probability distribution function may be the value of the mean of the first component probability distribution function. The method may include generating a value of said mean using the values of a plurality of measured parameter values selected from amongst the data sample set.

A hyper-parameter of the joint posterior probability distribution function may be the value of the scale parameter of the second component probability distribution function. The method may include generating a value of the scale parameter of the second component probability distribution function using the values of a plurality of measured parameter values selected from amongst the data sample set.

The second component probability distribution function may be a Gamma probability distribution function and the first component probability distribution function may be a Gaussian probability distribution function the value of the variance of which is determined according to a value(s) of the scale parameter (λ) of the joint posterior probability distribution function.

By equating the posterior distribution to the product of the data likelihood function (Gaussian or otherwise) and the prior distribution (e.g. conjugate prior), one may solve the resulting equation in terms of the hyper-parameters to determine recursive update equations for the values of the hyper-parameters associated with the observation of a specified number (e.g. m overall) of data values. For example, when the data likelihood is Gaussian as discussed above, the solution of the following equation:

$$N(\mu|\mu_m,[\beta_m\lambda]^{-1})Gam(\lambda|a_m,b_m)=p(X|\mu,\lambda)\cdot N(\mu|\mu_0,[\beta_0\lambda]^{-1})Gam(\lambda|a_0,b_0)$$

provides the following update equations used to determine the values of the hyper parameters $\mu_m$, $\beta_m$, $a_m$, $b_m$ after observing m data overall, in which $a_0$, $b_0$, $\beta_0$ and $\mu_0$ are predefined constants:

$$\mu_m = \frac{\beta_0\mu_0 + \sum_{i=1}^{m} x_i}{\beta_m}$$

and $$\beta_m = \beta_0 + m$$

and $$a_m = a_0 + \frac{m}{2}$$

and $$b_m = b_0 + \frac{1}{2}\left[\sum_{i=1}^{m} x_i^2 - \frac{1}{m}\left(\sum_{i=1}^{m} x_i\right)^2 + \frac{\beta_0 m}{\beta_0 + m}\left(\frac{1}{m}\sum_{i=1}^{m}(x_i - \mu_0)\right)^2\right].$$

Note that the integer m represents the overall cumulative number of data values ($x_i$) measured or observed. For example, if a first data sample set is provided, and j (j=integer) values are drawn thereform (e.g. defining a sub-sample data set), then the values $x_i$ (i=1, ..., j) are used in the cumulative sums, sums of squares etc of the above update equations, and the value of m is equal to the value j (m=j). If a subsequent data sample set is provided, and j' (j'=integer) values are drawn thereform (e.g. defining another sub-sample data set), then the values $x'_i$ (i=1, ..., j') are used in the cumulative sums etc of the above update equations, together with the earlier $x_i$ (i=1, ..., j) values acquired in the first sub-sample data set. The value of m is also updated to be equal to the value j+j' (m=j+j'). This iterative and cumulative updating occurs with acquisition of each new data sample set and each new j samples (e.g. sub-sample data set) drawn therefrom.

The above update equations are expressed only in terms of accumulated sums and sums-of-squares of the observed data, making it unnecessary to store the individual values $x_1$, ..., $x_m$. This is advantageous for on-line novelty detection, in which memory constraints may prohibit storage of the entire data set.

Hyper-parameters of the joint posterior probability distribution may include the mean and variance of the first component probability distribution function. The method may include generating the mean ($\mu_m$) and variance ($[\sigma_m]^2$) of the first component probability distribution function using m (m=integer) measured parameter values ($x_i$; i=1, ..., m) of the data sample set according to the following equations in which $\beta_0$ and $\mu_0$ are predefined constants:

$$\mu_m = \frac{\beta_0\mu_0 + \sum_{i=1}^{m} x_i}{\beta_m}, \text{ and } \sigma_m^2 = (\beta_m\lambda)^{-1}$$

where $\beta_m = \beta_0 + m$. Hyper-parameters of the joint posterior probability distribution may include the shape and scale parameters of the second component probability distribution function. The method may include generating the shape hyper-parameter value ($a_m$) and scale hyper-parameter value ($b_m$) of the second component probability distribution function using m (m=integer) measured parameter values ($x_i$; i=

1, ..., m) of the data sample set according to the following equations in which $a_0$, $b_0$, $\beta_0$ and $\mu_0$ are predefined constants:

$$a_m = a_0 + \frac{m}{2}$$

$$b_m = b_0 + \frac{1}{2}\left[\sum_{i=1}^{m} x_i^2 - \frac{1}{m}\left(\sum_{i=1}^{m} x_i\right)^2 + \frac{\beta_0 m}{\beta_0 + m}\left(\frac{1}{m}\sum_{i=1}^{m}(x_i - \mu_0)\right)^2\right].$$

As discussed above, the integer value m in these update equations may be the sum of the integer values j representing the sizes of independent data sets (e.g. sub-sample data sets) used to generate/update the hyper-parameters in previous and present iterations. Similarly, the summation of measured parameter values (x) may be the sum of the measured parameter values from independent data sets (e.g. sub-sample data sets) used to generate/update the hyper-parameters in previous and present iterations. In other words, for example, $m=(j_1+j_2+j_3+ \ldots +j_k)$ for the $k^{th}$ iteration/update using $j_k$ additional data values independent of those $(j_1+j_2+j_3+ \ldots + j_{k-1})$ data samples employed already.

Thus, by employing a means for quantifying a measure of uncertainty in the representation of "normality" in the apparatus or system to be monitored by the invention in the present aspect, it will be appreciated that the hyper parameter values may change and develop (or "learn") what is a most suitable set of EVDs, and most suitable set of weights therefor, in the weighted sum of EVDs used to determine the novelty threshold. As more data is observed, so the hyper parameter values settle upon those hyper parameter values of the most suitable EVD or EVDs. This also enables the re-learning of hyper-parameter values if the apparatus/system being monitored is deliberately changed and a new "normality" must be learned in order to avoid false positive "abnormality" indications based upon an outdated representation of "normality".

Figure 5A:
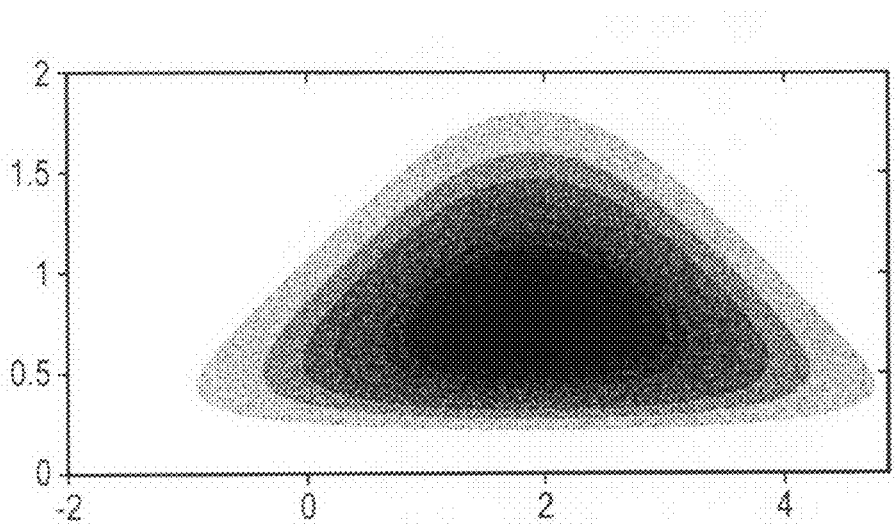
Figure 5B:
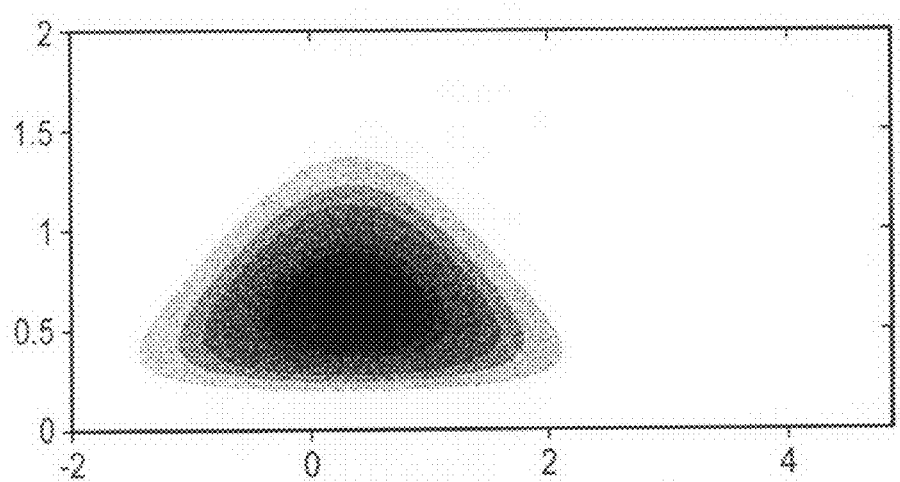
Figure 5C:
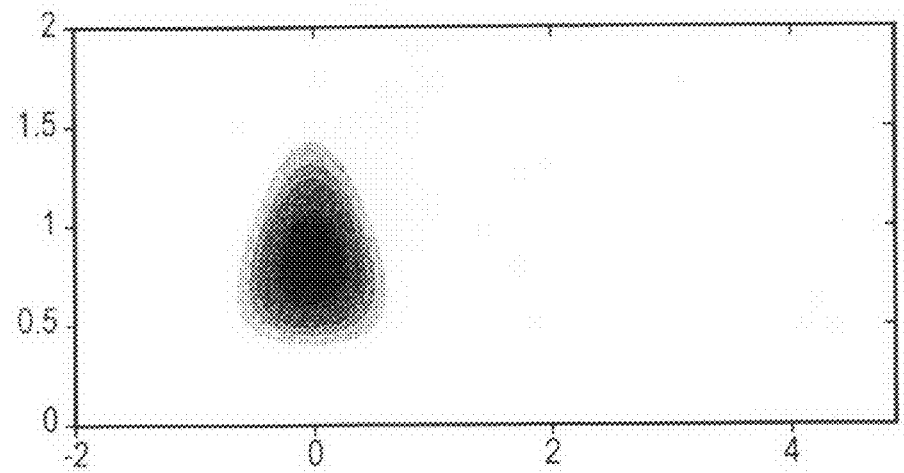

To illustrate this effect, FIGS. 5a, 5b and 5c graphically illustrate a Normal-Gamma joint posterior probability distribution generated using the values of m=0 (zero) (see FIG. 5a), m=10 (see FIG. 5b) and m=25 (see FIG. 5c) measured physical parameter values being updated using the above update equations after observing data ($\mu$ on x-axes, $\lambda$ on y-axes). Note that the ML coordinate pair ($M_{ML}$, $\lambda_{ML}$) occur at the peak of this distribution. As more data are observed (m increases), the distributions $p(\mu,\lambda)$ become more peaked around and towards the ML parameters as the range of data distributions likely to have generated the data decreases. As $m \to \infty$, the posterior $p(\mu, \lambda)$ tends to the Dirac delta function, located at a single most representative coordinate pair ($\mu,\lambda$).

It has been found that the frequency distribution of values of data in a sub-sample data set drawn from a main data sample set of observed parameter values, often tends to better approximate a Gaussian distribution than does the main data sample set. It has been found that the degree of approximation may depend upon the number of data sub-samples drawn (i.e. the size of the sub-sample data set), and an appropriate sub-sample size (integer j) may be selected to optimize this approximation. The better a data set approximates a Gaussian distribution, the better the assumption that extreme values drawn from that data set will be distributed according to a few or a single EVDs. Consequently, use of an appropriate value (integer j) in constructing the hyper parameters the joint posterior distribution results in a more appropriate form (e.g. location and scale) of EVD for use in the weighted sum thereof described above. The distribution of the j measured parameter values may approximate a Gaussian distribution more closely than the distribution of the values of such a sub-sample data set of a (e.g. any) different size. Selection of an appropriate size of the sub-sample set may be conducted by trial and error on a case-by-case basis to identify the optimal sub-sampling sampling scheme and sub-sample set size (j).

For example, preferably the sub-sample data set may include the extremal value. The value j may be selected such that the measured parameter values of a sub-sample data set of size j comprising j of the n measured parameter values, and including the extremal value, preferably conform to a distribution which approximates a Gaussian distribution more closely than that of such a sub-sample of a (or any) different size. The sub-sampling regime may involve sampling from different or disparate parts of the data sample set in addition to drawing the extremal value. It has been found that sub-sampling be selecting the highest j values (i.e. the maximum/highest value, the next highest, the next highest after that ... and so on until j samples are drawn), or lowest j values (i.e. the minimum/lowest value, the next lowest, the next lowest after that, and so on until j samples are drawn), of the data sample set provides an effective sub-sampling regime in this regard. Each of the measured parameter values of the sub-sample data set may be greater in value than any measured parameter value of the data sample set not also comprised in the sub-sample data set. Once a sub-sampling regime has identified the suitable value (j) for the sub-sample data set size for use in updating hyper-parameter values, further sub-sampling may, but need not, sub-sample the same number (j) when further observations of data sub-sets are used to subsequently update the hyper-parameters of the joint posterior distribution as discussed above. The values of measured physical parameters, and the number observed, in successive observations forming successive sub-sample data sets, adds/contributes to the cumulative sums in the update equations for the hyper-parameter values. That is to say, the sum over m in the update equations is a sum over the contents of successive (successively updating) sub-sample data sets of j data items.

Each extreme value probability distribution function in the weighted sum may be a Gumbel (Type I) distribution of the form:

$$H(y_m)=\exp(-\exp(y_m))$$

where $$y_m = \frac{x - \mu_m}{\sigma_m}$$

and x is the extremal data value, $y_m$ is the "reduced variate", $\mu_m$ is the location parameter of the EVD, and $\sigma_m$ is the scale parameter of the EVD. The subscript m denotes that the location and scale parameters are determined using the integer value m, and m cumulative measured parameter values, in the above update equations. Thought a Type II (Frechet) or Type III (Weibull) EVD may be employed, the Type I (Gumbel) EVD is particularly suitable when the data from which the extremal value is drawn in distributed according to a distribution approximating a Gaussian form.

In general, the method may include selecting coordinates of a point in the coordinate space of the random variables of the joint posterior probability distribution function (whether it be Normal-Gamma or otherwise), the coordinates being selected from amongst a predetermined finite plurality of different such coordinates surrounding the coordinates corresponding to the location of the peak of the joint posterior probability distribution function, and using the value of the selected coordinates to determine the value of a location parameter and the value of a scale parameter of a said extreme value probability distribution function.

The value of the weight associated with a given extreme value probability distribution (EVD) function in said weighted sum may be the value of the joint posterior probability distribution function as at coordinates of the variables thereof corresponding to the values of the location and scale parameters of the given EVD.

According to the method, there may be defined a plurality of separate regions in said coordinate space having a common associated probability mass according to the joint posterior probability distribution function within that region, wherein a given said selected coordinates are selected to be the coordinates of the centroid of probability mass in a given said region. Neighbouring said regions may be contiguous.

For example, where the data likelihood is Gaussian, as discussed in examples above, an expression for the second integrand, $p(\mu,\lambda|X)$ is given. The final integral is of the form:

$$p(x|X) = \int_{-\infty}^{\infty}\int_{0}^{\infty} \sqrt{\lambda_m}$$
$$\exp(-y_m - \exp(y_m)) \cdot N(\mu|\mu_m, [\beta_m\lambda]^{-1})Gam(\lambda|a_m, b_m)d\lambda d\mu$$

Though no closed form expression can be found for this integration, an accurate approximation is given by discretising using K pairs $\theta = (\mu, \lambda)$:

$$p(x|X) \approx \sum_{i=1}^{K} p(x|\theta_i)P(\theta_i|X)$$

Which is a weighted sum of K EVDS, where the $i^{th}$ weight is the probability, $P(\theta_i|X)$, that the parameter pair $\theta_i = (\mu, \lambda)_i$ are the true parameters. A novelty threshold may be set by generating the cumulative probability distribution of the overall EVD, found by integrating the above equation:

$$p(x|X) = \int p(x|X)dx \approx \sum_{i=1}^{K} P(\theta_i|X)\exp(-\exp(y_m))$$

which provides a novelty threshold on the overall EVD at some fixed probability P(x).

Figure 6:
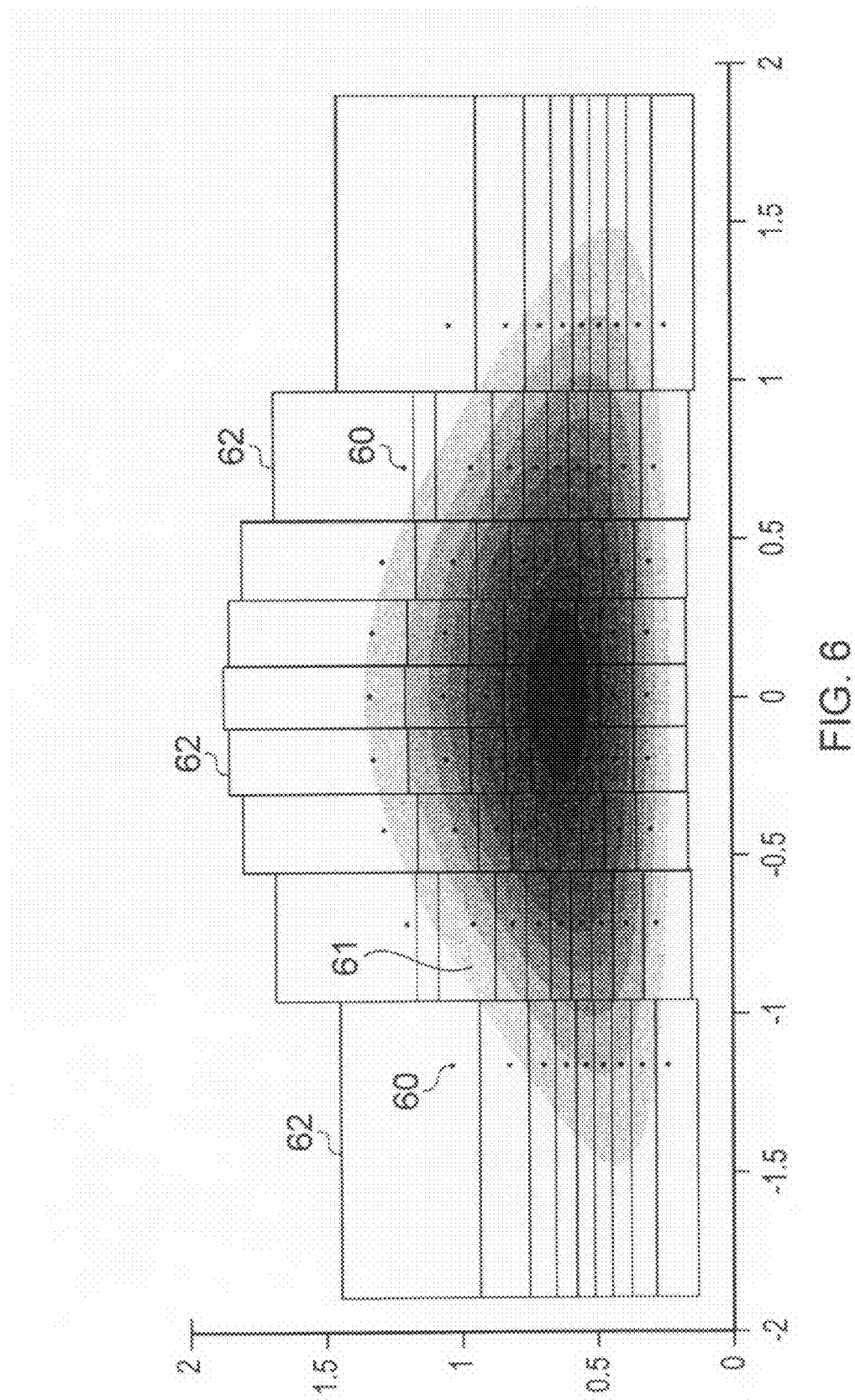

To perform the weighted sum, an SXS mesh of samples (e.g. equiprobable samples) over the joint posterior distribution (where $S^2=K$) may be defined as follows. Partition $p(\mu,\lambda|X)$ into S×S regions (e.g. equiprobable regions) of area 1/K, and select a single sample pair $(\mu,\lambda)$ to represent each region. An example is shown in FIG. 6 in which S=9, and wherein equiprobable sampling of the joint posterior probabilities $p(\mu,\lambda|X)$, using a mesh of 9×9 samples ($\mu$ on the x-axis, $\lambda$ on the y-axis), is illustrated. Of course, any integer value of S other than 9 may be chosen (e.g. S=3, or 4, or 5, . . . etc). The samples (coordinate pair $(\mu,\lambda)$) chosen for each defined region occur at the centroid of probability mass for that region. In such examples, regions so defined may be equiprobable in the sense that the volume of the joint posterior function defined within a given region (e.g. integral over all coordinates $(\mu,\lambda)$ over only the given region) is common to all such regions so defined. Other sampling methods may be used in selecting a plurality of coordinate pairs $(\mu,\lambda)$, such as constructing a structured, or regular, or uniform array of coordinate pairs $(\lambda,\mu)$ which may be centred upon the peak in the value of the joint posterior distribution.

For example, in constructing the sampling mesh of equiprobable samples of the joint posterior distribution (coordinate pairs $(\mu,\lambda)$), one may treat each axis ($\mu$ axis and $\lambda$ axis) independently according to the following steps:

Step 1:

Find S equiprobable samples along the plane $\lambda = \lambda_{ML}$; i.e. the plane parallel to the $\mu$-axis passing through the peak of $p(\mu,\lambda)$.

Step 2:

For each sample $S_i$ found in Step 1, find S equiprobable samples along the plane $\mu=S_i$; i.e., the plane parallel to the $\lambda$-axis passing through $\mu=S_i$.

In step 1, one may initially define the equation of the plane $\lambda=C$ for constant C as:

$$p(\mu,\lambda|X)_{\lambda=C} = CN(\mu|\mu_m,(\beta_m\lambda)^{-1})$$

and compute the S samples of step 1 by sampling the cumulative distribution of this equation (i.e. the Normal/Gaussian distribution) at intervals/increments in $\mu$ which correspond to regular or equal increments/intervals in the value of the cumulative distribution being sampled (e.g. intervals of 1/(S+1) for S samples). The increments in $\mu$ may be spaced so as to correspond to values of the cumulative distribution which are spaced (e.g. regularly/uniformly) between the minimum value (e.g. zero) and the maximum value (e.g. one) thereof. The cumulative distribution may take the form:

$$P(\mu) = \frac{1}{2}\left[1 - \text{erf}\left\{\sqrt{\frac{\beta_m\lambda}{2}}(\mu - \mu_m)\right\}\right]$$

Where $\lambda=C$ for constant C. The sampling of the $i^{th}$ sample of S samples of this cumulative distribution may be such that $$P(\mu_i) - P(\mu_{i-1}) = \frac{1}{S+1}$$

consequently, each sample may be said to be equiprobable.

In step 2, one may initially define the equation of the plane $\mu+C$ where C is constant, as:

$$p(\mu,\lambda|X)|_{\mu=C} = C\sqrt{\lambda}Gam(\lambda|a_m,c_m)$$

where $c_m=b_m\beta_m(C-\mu_m)^2/2$. The corresponding cumulative distribution used to generate the S samples of step 2 may be found by integrating the above equation to yield:

$$P(\lambda) = 1 - \frac{\Gamma(a_m+1/2, c_m\lambda)}{\Gamma(a_m+1/2)}$$

Where $\Gamma(x)$ is the Gamma function. The method may include computing the S samples of step 2 by sampling this cumulative distribution at intervals/increments in $\lambda$ which correspond to regular or equal increments/intervals in the value of the cumulative distribution being sampled (e.g. intervals of 1/(S+1) for S samples). The increments in $\lambda$ may be spaced so as to correspond to values of the cumulative distribution which are spaced (e.g. regularly/uniformly) between the minimum value (e.g. zero) and the maximum value (e.g. one)

thereof. The sampling of the $i^{th}$ sample of S samples of this cumulative distribution may be such that $$P(\lambda_i) - P(\lambda_{i-1}) = \frac{1}{S+1}$$

consequently, each sample may be said to be equiprobable.

Thus, the whole sample mesh may be generated for use in generating the hyper-parameters of the weighted sum of EVDs and the values of the respective weights thereof. Then, the overall extreme value probability distribution function may be generated and a novelty threshold defined therewith as discussed above. A selected extremal measured physical parameter value may then be applied thereto to determine of the selected value is "normal" or "novel".

A novelty threshold may be set as follows:

$$P(x|X) = \sum_{i=1}^{K} P(\theta_i|X)\exp(-\exp(y_m))$$

where $$\sum_{i=1}^{K} P(\theta_i|X)\exp(-\exp(y_m)) \approx \int p(x|X)dx$$

as discussed above.

The extremal value may be the maximum value (e.g. Max$[x_1, \ldots, x_j]$ of the data set $\{x_1, \ldots, x_j\}$ of j values x), or the minimum value (e.g. Min$[x_1, \ldots, x_j]$ of the data set X= $\{x_1, \ldots, x_j\}$ of j data values x), of the data sample set. The methods applied to determining the probability of observing a minimum value may include the initial step of transforming each of the data sample values of the data sample set (or sub-sample data set) by changing the sign thereof, without changing the magnitude thereof, such that a positive original value $x_i$ is transformed into a negative value $z_i$ of the same magnitude and a negative original value $x_i$ is transformed into a positive value $z_i$ of the same magnitude. That is to say: $z_i=-x_i$; for i=1 to j. Consequently, small (e.g. minimum) values in the set X of original data values correspond to large (e.g. maximum) values in the set Z (Z=$\{z_1, \ldots, z_j\}$) of transformed data values. Thus, Max$[z_1, \ldots z_j]$=Min$[x_1, \ldots x_j]$. The methods described herein, in any aspect of the invention, may then be applied to determining the probability of observing the value Max$[z_1, \ldots z_j]$ for the purposes of conditionally indicating whether the value in question is abnormal.

The value (j) of the size of the sub-sample data-set may be a value selected from following integers: 3 to 10. The value (j) of the size of the sub-sample data set may be 3, or 4 or 5 (j=3, or j=4, or j=5).

It will be appreciated that the invention in its first aspect may be realised in an apparatus arranged to implement that method, and such an apparatus is encompassed within the scope of the invention. Accordingly, the invention in its third aspect provides a realisation of the invention in its first aspect, and a realisation of some, any or all optional or additional method features discussed above in relation to the first aspect of the invention are encompassed herein as corresponding functionalities of the apparatus described below.

For example, in a third of its aspects, the invention may provide an apparatus for detecting an abnormality in (e.g. in operating characteristics or function of the apparatus/system) an apparatus or system including:

data acquisition means for acquiring a data sample set comprising n (n=integer) values of a measured physical parameter associated with the apparatus or system generated by repeating a measurement of the physical parameter n times;

selector means for selecting an extremal measured parameter value from amongst the data sample set;

calculation means for determining a probability of observing (e.g. of observing a value not exceeding the selected parameter value) the selected parameter value by applying the selected parameter value to an extreme value probability distribution function having a location parameter and a scale parameter wherein the value of the location parameter and the value of the scale parameter are each constructed using an integer value m (e.g. notionally representing the size of a sub-sample data set comprising m of said measured parameter values) in which m is less than n (i.e. m<n);

indicator means for conditionally indicating that the selected parameter value is abnormal according to the value of said probability of observing the selected parameter value.

The extreme value probability distribution function may be a cumulative probability distribution function, and the calculation means may be arranged to determine the probability of observing the selected parameter value by applying the selected value directly to the extreme value probability distribution function to determine a probability of observing a value not exceeding the selected parameter value. The extreme value probability distribution function may be an integral of a probability density function integrated between two limits one of which (upper limit or lower limit) is the selected parameter value. The calculation means may be arranged to determine that integral accordingly.

The indicator means may be arranged to compare the probability of observing the selected parameter value to a predetermined threshold value, and to conditionally indicate an abnormal parameter value on condition that the probability value exceeds the threshold value. For example, the threshold value may be a threshold probability value from, or between, 0.95 and 1.0 to which the cumulative probability of observing a value not exceeding the selected parameter value is compared.

The indicator means may be arranged to generate a visible, and/or audible indication. Preferably the indication includes a graphical indication of abnormality. The indication may take the form of an alarm signal or warning.

The integer value m is preferably such that the distribution of the m measured parameter values of a sub-sample data set of size m preferably approximates a Gaussian distribution more closely than the distribution of the values of such a sub-sample data set of a different size (e.g. any different size). The sub-sample data set may include the extremal value. Each of the measured parameter values of the sub-sample data set preferably is greater in value than any measured parameter value of the data sample set not also comprised in the sub-sample data set.

The sub-sampling (which the apparatus may be arranged to perform) may involve sampling from different or disparate parts of the data sample set in addition to drawing the extremal value. It has been found that sub-sampling by selecting the highest m values (i.e. the maximum/highest value, the next highest, the next highest after that . . . and so on until m samples are drawn), or lowest m values (i.e. the minimum/lowest value, the next lowest, the next lowest after that, and so on until m samples are drawn), of the data sample set provides an effective sub-sampling regime in this regard. Each of the measured parameter values of the sub-sample data set may be greater in value than any measured parameter value of the data sample set not also comprised in the sub-sample data set. Once a sub-sampling regime of the apparatus has identified the suitable value (m) for the sub-sample data set size for use in defining the EVD, further sub-sampling need not be undertaken in respect of novelty detection on the apparatus or system to be monitored since the EVD has been defined.

The calculation means may be arranged to apply the selected parameter value to a Gumbel (Type I) extreme value probability distribution function of the form:

$$H(y_m) = \exp(-\exp(y_m))$$

where $$y_m = \frac{x - \mu_m}{\sigma_m}$$

and x is the extremal data value, $y_m$ is the "reduced variate", $\mu_m$ is the location parameter of the EVD, and $\sigma_m$ is the scale parameter of the EVD. The subscript m denotes that the location and scale parameters are determined using the integer value m. Type II (Frechet) or Type III (Weibull) EVD may be employed.

The selector means may be arranged to select an extremal value in the form of the maximum value (e.g. $\text{Max}[x_1, \ldots, x_j]$ of the data set $\{x_1, \ldots, x_j\}$ of j values x), or the minimum value (e.g. $\text{Min}[x_1, \ldots, x_j]$ of the data set $X=\{x_1, \ldots, x_j\}$ of j data values x), of the data sample set. The calculation means may be arranged to determine the probability of observing a minimum value by initially transforming each of the data sample values of the data sample set (or sub-sample data set) by changing the sign thereof, without changing the magnitude thereof. As such, a positive original value $x_i$ is transformed into a negative value $z_i$ of the same magnitude and a negative original value $x_i$ is transformed into a positive value $z_i$ of the same magnitude. That is to say: $z_i = -x_i$; for i=1 to j. Consequently, small (e.g. minimum) values in the set X of original data values correspond to large (e.g. maximum) values in the set Z ($Z=\{z_1, \ldots, z_j\}$) of transformed data values. Thus, $\text{Max}[z_1, \ldots, z_j] = \text{Min}[x_1, \ldots, x_j]$. The calculation means may be arranged to then determine the probability of observing the value $\text{Max}[z_1, \ldots, z_j]$ for the purposes of conditionally indicating whether the value in question is abnormal.

The calculation means may be arranged to construct the location parameter ($\mu_m$) of the extreme value probability distribution function according to the following equation:

$$\mu_m = \sqrt{2\ln(m)} - \frac{\ln(\ln(m)) + \ln(4\pi)}{2\sqrt{2\ln(m)}}$$

The location parameter value ($\mu_m$) when employed in an EVD representing a minimum extremal value may be constructed by the calculation means according to the following equation:

$$\mu_m = -\sqrt{2\ln(m)} + \frac{\ln(\ln(m)) + \ln(4\pi)}{2\sqrt{2\ln(m)}}$$

The calculation means may be arranged to construct the scale parameter ($\sigma_m$) of the extreme value probability distribution function according to the following equation:

$$\sigma_m = \frac{1}{\sqrt{2\ln(m)}}$$

The value (m) may be a value selected from following integers: 3 to 10, such as 3, or 4, or 5 (m=3, or m=4, or m=5).

The data acquisition means may be arranged to repeating n (n=integer) times a measurement of a physical parameter associated with the apparatus of system thereby to generate said data sample set comprising said n measured parameter values.

It will be appreciated that the invention in its second aspect may be realised in an apparatus arranged to implement that method, and such an apparatus is encompassed within the scope of the invention. Accordingly, the invention in its fourth aspect provides a realisation of the invention in its second aspect, and a realisation of some, any or all optional or additional method features discussed above in relation to the second aspect of the invention are encompassed herein as corresponding functionalities of the apparatus described below.

In a fourth of its aspects, the invention may provide apparatus for detecting an abnormality in (e.g. in operating characteristics or function of the apparatus/system) an apparatus or system including:
  data acquisition means for acquiring a data sample set comprising a plurality of values of a measured physical parameter associated with the apparatus or system generated by repeating a measurement of the physical parameter a plurality of times;
  selector means for selecting an extremal measured parameter value from amongst the sample set;
  calculation means for determining a probability of observing the selected parameter value (e.g. of observing a value not exceeding the selected parameter value) by applying the selected parameter value to a probability distribution function comprising a weighted sum of a plurality of extreme value probability distribution functions each having a location parameter and a scale parameter wherein the value of the location parameter and the value of the scale parameter are determined according to an estimation of the probability thereof;
  indicator means for conditionally indicating that the selected parameter value is abnormal according to the value of said probability.

The calculation means may be arranged to determine said probability of observing the selected parameter value using a plurality of measured physical parameter values from the data sample set to recursively update a prior said estimation.

For example, the invention in this aspect may set classical EVT within a Bayesian framework, to quantify uncertainty in the representation of normality, and thus implementing or realising the method discussed above in the second aspect of the invention, for overcoming the disadvantages discussed above.

The calculation means may be arranged to generate the estimation using a plurality of measured physical parameter values from another data sample set which is independent of the data sample set and which comprises a plurality of values of the physical parameter generated by repeating the measurement of that physical parameter a corresponding plurality of times.

The calculation means may be arranged to determine the value of the weight associated with a given extreme value probability distribution function in said weighted sum according to the estimation.

The calculation means may be arranged to generate the estimation. This may be done using a joint posterior probability distribution function. The joint posterior probability distribution may comprise the product of a first component probability distribution function for the value of the location parameter, and a second component probability distribution function for the value of the scale parameter.

The calculation means may be arranged to select coordinates of a point in the coordinate space of the random variables of the joint posterior probability distribution function, and to use the value of the selected coordinates to determine the value of a location parameter and the value of a scale parameter of a said extreme value probability distribution function. The coordinates may be selected from amongst a predetermined finite plurality of different such coordinates. These may be coordinates surrounding the coordinates corresponding to the location of the peak of the joint posterior probability distribution function.

The calculation means may be arranged to define a plurality of separate regions in said coordinate space having a common associated probability mass according to the joint posterior probability distribution function within that region, to determine the centroid of probability mass within each region wherein a given selected coordinates are selected to be the coordinates of the centroid of probability mass in a given such region.

Neighbouring such regions may be contiguous.

The calculation means may be arranged to select a plurality of the measured parameter values from amongst the data sample set and to generate a value for a hyper-parameter of the joint posterior probability distribution function using the measured values so selected.

The calculation means may be arranged to generate a value for a hyper-parameter of the joint posterior probability distribution function using an integer value (j) representing the size of a sample data set comprising j of the n (n=integer) measured parameter values of the data sample set.

The integer value j may be less than the integer value n (i.e. j<n) representing the number of measured parameter values comprised in the data sample set such that the sample data set is a sub-sample data set.

The calculation means may be arranged to generate the value of each hyper-parameter using the integer value j.

A hyper-parameter of the joint posterior probability distribution function may be the value of the mean of the first component probability distribution function. The calculation means may be arranged to generate a value of the mean using the values of a plurality of measured parameter values selected from amongst the data sample set.

A hyper-parameter of the joint posterior probability distribution function may be the value of the scale parameter of the second component probability distribution function. The calculation means may be arranged to generate a value of the scale parameter of the second component probability distribution function using the values of a plurality of measured parameter values selected from amongst the data sample set.

The second component probability distribution function may be a Gamma probability distribution function. The first component probability distribution function may be a Gaussian probability distribution function. The calculation means may be arranged to determine the value of the variance according to a value(s) of the scale parameter ($\lambda$) of the joint posterior probability distribution function.

Hyper-parameters of the joint posterior probability distribution may include the mean and variance of the first component probability distribution function. The calculation means may be arranged to generate the mean ($\mu_m$) and variance ($[\sigma_m]^2$) of the first component probability distribution function using m (m=integer) measured parameter values ($x_i$; i=1, ..., m) according to the following equations in which $\beta_0$ and $\mu_0$ are predefined constants:

$$\mu_m = \frac{\beta_0 \mu_0 + \sum_{i=1}^{m} x_i}{\beta_m}, \text{ and}$$

$$\sigma_m^2 = (\beta_m \lambda)^{-1}$$

where $\beta_m = \beta_0 + m$.

Hyper-parameters of the joint posterior probability distribution may include the shape and scale parameters of the second component probability distribution function. The calculation means may be arranged to generate the shape hyper-parameter value ($a_m$) and scale hyper-parameter value ($b_m$) of the second component probability distribution function using m (m=integer) measured parameter values ($x_i$; i=1, ..., m) according to the following equations in which $a_0$, $b_0$, $\beta_0$ and $\mu_0$ are predefined constants:

$$a_m = a_0 + \frac{m}{2}$$

$$b_m = b_0 + \frac{1}{2}\left[\sum_{i=1}^{m} x_i^2 - \frac{1}{m}\left(\sum_{i=1}^{m} x_i\right)^2 + \frac{\beta_0 m}{\beta_0 + m}\left(\frac{1}{m}\sum_{i=1}^{m}(x_i - \mu_0)\right)^2\right].$$

As discussed above, the integer value m in these update equations may be the sum of the integer values j representing the sizes of independent data sets (e.g. sub-sample data sets) used to generate/update the hyper-parameters in previous and present iterations. Similarly, the summation of measured parameter values (x) may be the sum of the measured parameter values from independent data sets (e.g. sub-sample data sets) used to generate the hyper-parameters in previous and present iterations.

The sub-sample data set preferably includes the extremal value. The distribution of the j measured parameter values of the sub-sample data set preferably approximates a Gaussian distribution more closely than the distribution of the values of such a sub-sample data set of a (or preferably any) different size (e.g. number of data sub-samples).

Preferably, each of the measured parameter values of the sub-sample data set is greater in value than any measured parameter value of the data sample set not also comprised in the sub-sample data set.

Selection of an appropriate size of the sub-sample set may be conducted by, or using, the apparatus by trial and error on a case-by-case basis to identify the optimal sub-sampling sampling scheme and sub-sample set size (j).

The value j may be selected such that the measured parameter values of a sub-sample data set of size j comprising j of the n measured parameter values, and including the extremal value, preferably conform to a distribution which approximates a Gaussian distribution more closely than that of such a sub-sample of a (or any) different size. The sub-sampling regime may involve sampling from different or disparate parts of the data sample set in addition to drawing the extremal value. It has been found that sub-sampling be selecting the highest j values (i.e. the maximum/highest value, the next highest, the next highest after that . . . and so on until j samples are drawn), or lowest j values (i.e. the minimum/lowest value, the next lowest, the next lowest after that, and so on until j samples are drawn), of the data sample set provides an effective sub-sampling regime in this regard.

The extreme value probability distribution function may be a Gumbel (Type I) distribution. The calculation means may be arranged to apply the selected parameter value to a Gumbel (Type I) extreme value probability distribution function of the form:

$$H(y_m) = \exp(-\exp(y_m))$$

where $$y_m = \frac{x - \mu_m}{\sigma_m}$$

and x is the extremal data value, $y_m$ is the "reduced variate", $\mu_m$ is the location parameter of the EVD, and $\sigma_m$ is the scale parameter of the EVD. Type II (Frechet) or Type III (Weibull) EVD may be employed.

The apparatus (e.g. the calculation means) may be arranged to select coordinates of a point in the coordinate space of the random variables of the joint posterior probability distribution function (whether it be Normal-Gamma or otherwise), the coordinates being selected from amongst a predetermined finite plurality of different such coordinates surrounding the coordinates corresponding to the location of the peak of the joint posterior probability distribution function, and to use the value of the selected coordinates to determine the value of a location parameter and the value of a scale parameter of a said extreme value probability distribution function.

The value of the weight generated by the calculation means associated with a given extreme value probability distribution (EVD) function in said weighted sum may be the value of the joint posterior probability distribution function as at coordinates of the variables thereof corresponding to the values of the location and scale parameters of the given EVD.

The calculation means may define a plurality of separate regions in said coordinate space having a common associated probability mass according to the joint posterior probability distribution function within that region, wherein a given said selected coordinates are selected by the calculation means to be the coordinates of the centroid of probability mass in a given said region. Neighbouring said regions may be contiguous. The calculation means may be arranged to perform this task according to any of the methods discussed above in the second aspect of the invention.

For example, in constructing the sampling mesh of equiprobable samples of the joint posterior distribution (coordinate pairs ($\mu,\lambda$)), the calculation means may treat each axis ($\mu$ axis and $\lambda$ axis) independently according to the following steps:

Step 1:
Find S equiprobable samples along the plane $\lambda = \lambda_{ML}$; i.e. the plane parallel to the $\mu$-axis passing through the peak of $p(\mu,\lambda)$.

Step 2:
For each sample $S_i$ found in Step 1, find S equiprobable samples along the plane $\mu = S_i$; i.e., the plane parallel to the $\lambda$-axis passing through $\mu = S_i$.

In step 1, the calculation means may initially define the equation of the plane $\lambda = C$ for constant C as:

$$p(\mu,\lambda|X)|_{\lambda=C} = C'N(\mu|\mu_m, (\beta_m\lambda)^{-1})$$

and compute the S samples of step 1 by sampling the cumulative distribution of this equation (i.e. the Normal/Gaussian distribution) at intervals/increments in $\mu$ which correspond to regular or equal increments/intervals in the value of the cumulative distribution being sampled (e.g. intervals of 1/(S+1) for S samples). The increments in $\mu$ may be spaced so as to correspond to values of the cumulative distribution which are spaced (e.g. regularly/uniformly) between the minimum value (e.g. zero) and the maximum value (e.g. one) thereof. The cumulative distribution may take the form:

$$P(\mu) = \frac{1}{2}\left[1 + \mathrm{erf}\left\{\sqrt{\frac{\beta_m\lambda}{2}}(\mu - \mu_m)\right\}\right]$$

Where $\lambda = C$ for constant C. The sampling of the $i^{th}$ sample of S samples of this cumulative distribution may be such that $$P(\mu_i) - P(\mu_{i-1}) = \frac{1}{S+1}$$

consequently, each sample may be said to be equiprobable.

In step 2, the calculation means may initially define the equation of the plane $\mu = C$ where C is constant, as:

$$p(\mu,\lambda|X)|_{\mu=C} = C'\sqrt{\lambda}Gam(\lambda|a_m, c_m)$$

where $c_m = b_m + \beta_m(C-\mu_m)^2/2$. The corresponding cumulative distribution used to generate the S samples of step 2 may be found by integrating the above equation to yield:

$$P(\lambda) = 1 - \frac{\Gamma(a_m + 1/2, c_m\lambda)}{\Gamma(a_m + 1/2)}$$

Where $\Gamma(x)$ is the Gamma function. The calculation means may compute the S samples of step 2 by sampling this cumulative distribution at intervals/increments in $\lambda$ which correspond to regular or equal increments/intervals in the value of the cumulative distribution being sampled (e.g. intervals of 1/(S+1) for S samples). The increments in $\lambda$ may be spaced so as to correspond to values of the cumulative distribution which are spaced (e.g. regularly/uniformly) between the minimum value (e.g. zero) and the maximum value (e.g. one) thereof. The sampling of the $i^{th}$ sample of S samples of this cumulative distribution may be such that $$P(\lambda_i) - P(\lambda_{i-1}) = \frac{1}{S+1}$$

consequently, each sample may be said to be equiprobable.

Thus, the whole sample mesh may be generated for use in generating the hyper-parameters of the weighted sum of EVDs and the values of the respective weights thereof. Then, the overall extreme value probability distribution function may be generated, by the calculation means, and a novelty threshold defined therewith as discussed above. A selected extremal measured physical parameter value may then be applied thereto to determine of the selected value is "normal"

or "novel". The calculation means may be arranged to set a novelty threshold as follows:

$$P(x \mid X) = \sum_{i=1}^{K} P(\theta_i \mid X)\exp(-\exp(y_m)) \text{ where}$$

$$\sum_{i=1}^{K} P(\theta_i \mid X)\exp(-\exp(y_m)) \approx \int p(x \mid X)dx$$

as discussed above.

The selector means may be arranged to select an extremal value in the form of the maximum value (e.g. $\text{Max}[x_1, \ldots, x_j]$ of the data set $\{x_1, \ldots, x_j\}$ of j values x), or the minimum value (e.g. $\text{Min}[x_1, \ldots, x_j]$ of the data set $X=\{x_1, \ldots, x_j\}$ of j data values x), of the data sample set. The calculation means may be arranged to determine the probability of observing a minimum value by initially transforming each of the data sample values of the data sample set (or sub-sample data set) by changing the sign thereof, without changing the magnitude thereof. As such, a positive original value $x_i$ is transformed into a negative value $z_i$ of the same magnitude and a negative original value $x_i$ is transformed into a positive value $z_i$ of the same magnitude. That is to say: $z_i=-x_i$; for i=1 to j. Consequently, small (e.g. minimum) values in the set X of original data values correspond to large (e.g. maximum) values in the set Z ($Z=\{z_1, \ldots, z_j\}$) of transformed data values. Thus, $\text{Max}[z_1, \ldots, z_j]=\text{Min}[x_1, \ldots, x_j]$. The calculation means may be arranged to then determine the probability of observing the value $\text{Max}[z_1, \ldots, z_j]$ for the purposes of conditionally indicating whether the value in question is abnormal. The extremal value may be the maximum value, or the minimum value, of the data sample set.

The value (j) of the size of the sub-sample data-set is a value selected from following integers: 3 to 10; e.g. 3, or 4 or 5 (j=3, or j=4, or j=5).

The data acquisition means may be arranged to repeating a plurality of times a measurement of a physical parameter associated with the apparatus or system thereby to generate said data sample set comprising said plurality of measured parameter values.

The data acquisition means may include data measurement means arranged to measure values of said physical parameter. The data acquisition means preferably includes a data storage means arranged to receive data and to retrievably store received data. The calculation means may be a computer means.

The indicator means may be arranged to provide a visual conditional indication of an occurrence of an abnormal measured parameter value.

In a further of its aspects, the invention may provide a detector for detecting an abnormality in an apparatus or system including the apparatus according to the invention in any of its third or fourth aspects.

In another of its aspects, the invention may provide an engine in combination with a detector described above arranged to detect an abnormality in operating characteristics of the engine.

Any of the method(s) described above may preferably be computer-implemented.

In yet another of its aspects, the invention may provide a computer means containing computer program instructions executable thereon to implement any of the method(s) described above.

In an additional aspect, the invention may provide a computer program product containing computer program instructions executable on a computer means to implement any of the method(s) described above.

In an additional aspect, the invention may provide the use of a computer or computer system/apparatus or computer means to implement any of the method(s) described above.

In another aspect, the invention may provide apparatus arranged to implement the method of the invention in its first aspect and/or in its second aspect, preferably including any some or all of the optional and/or preferable features of the respective first and second aspects as discussed above.

In any aspect of the invention, a physical parameter value may be a value representing any physically measurable quantity of a type, or representing a property, selected from, but not limited to, one of the following, for example: a mechanical, electrical, magnetic, electromagnetic property/quantity; a velocity, speed, frequency, position, acceleration, angle, force, mass, weight, amplitude, temperature, time or time interval, current, charge, voltage, vibration, luminous intensity, amount or substance, density, pressure, radioactivity.

Figure 3:
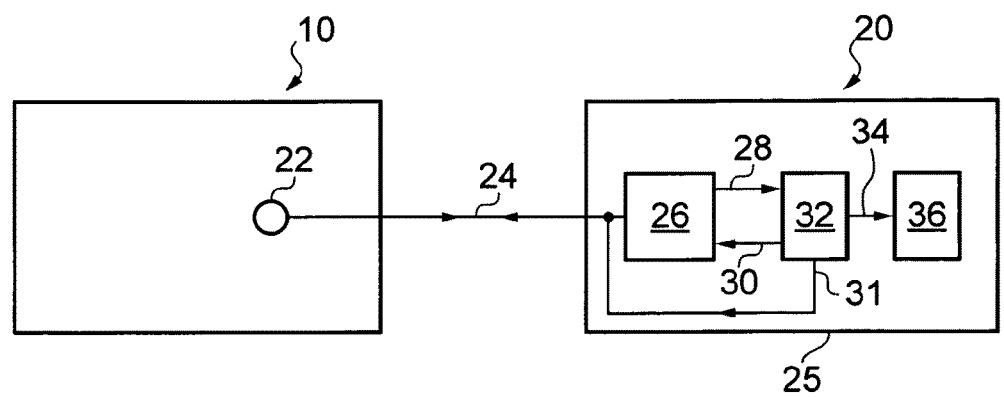
Figures 4A, 4B:
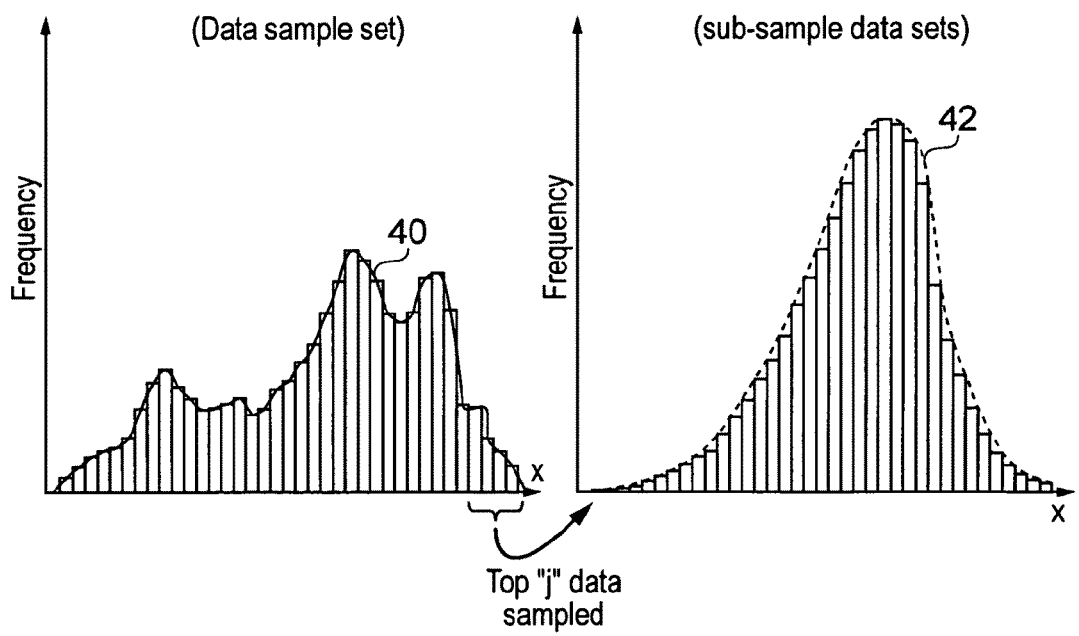
Figure 7:
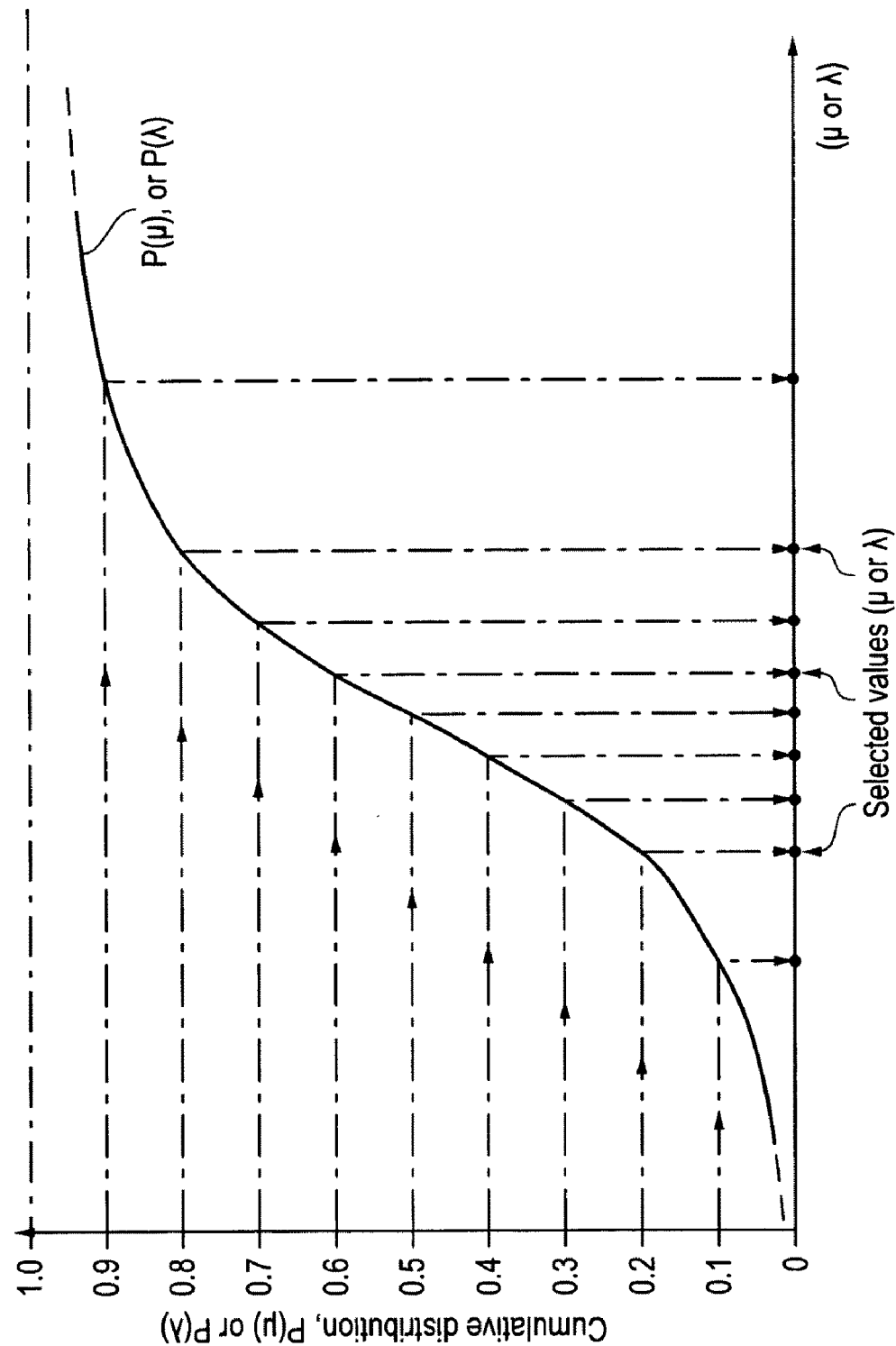
Figure 8A:
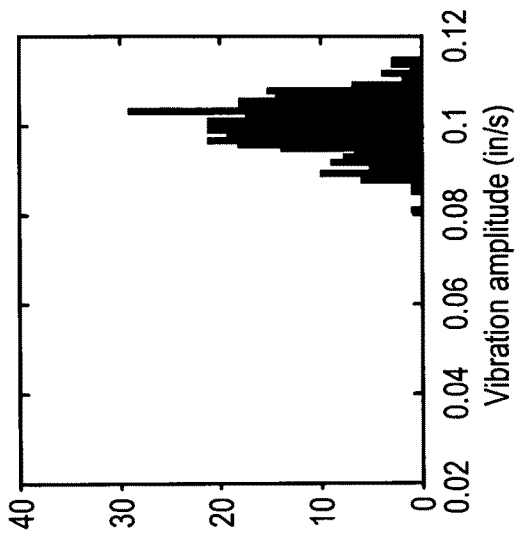
Figure 8B:
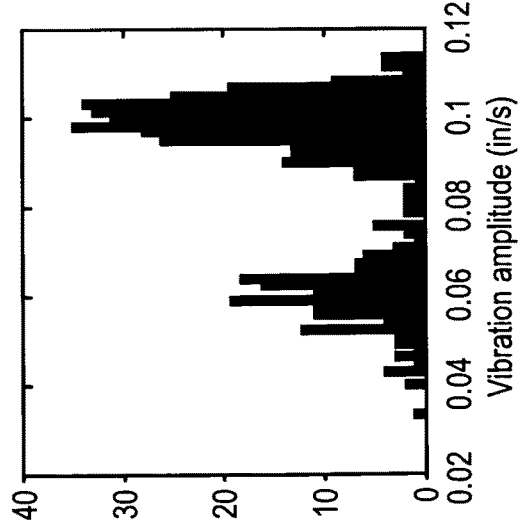
Figure 9:
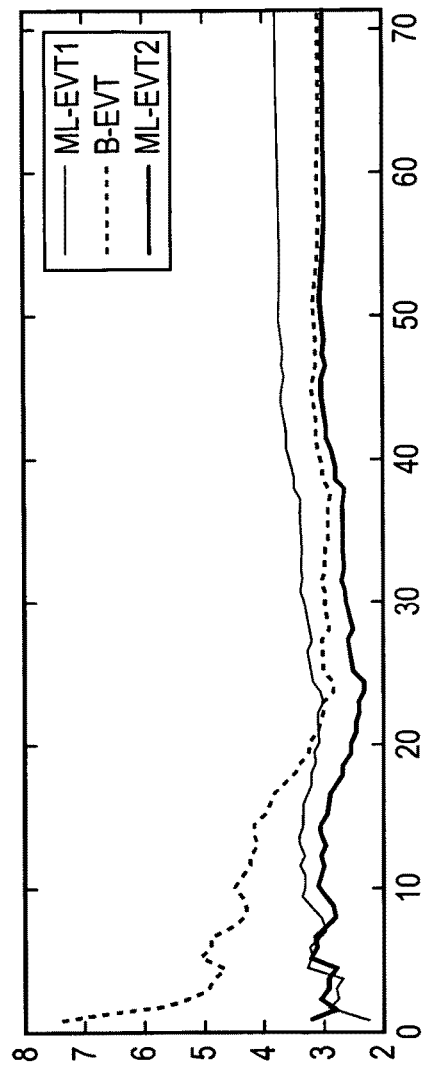
Figure 10:
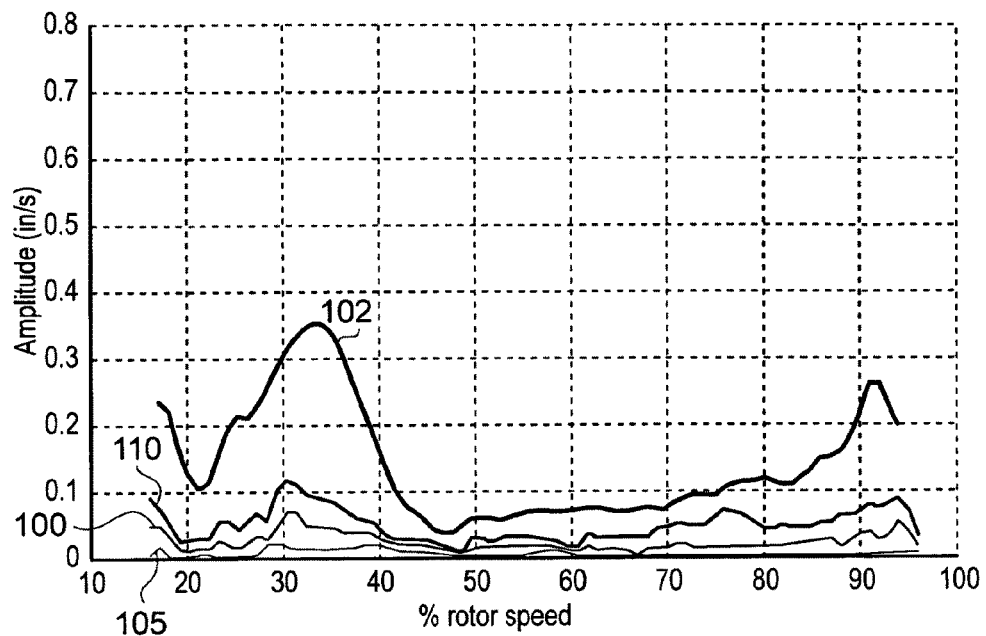
Figure 11:
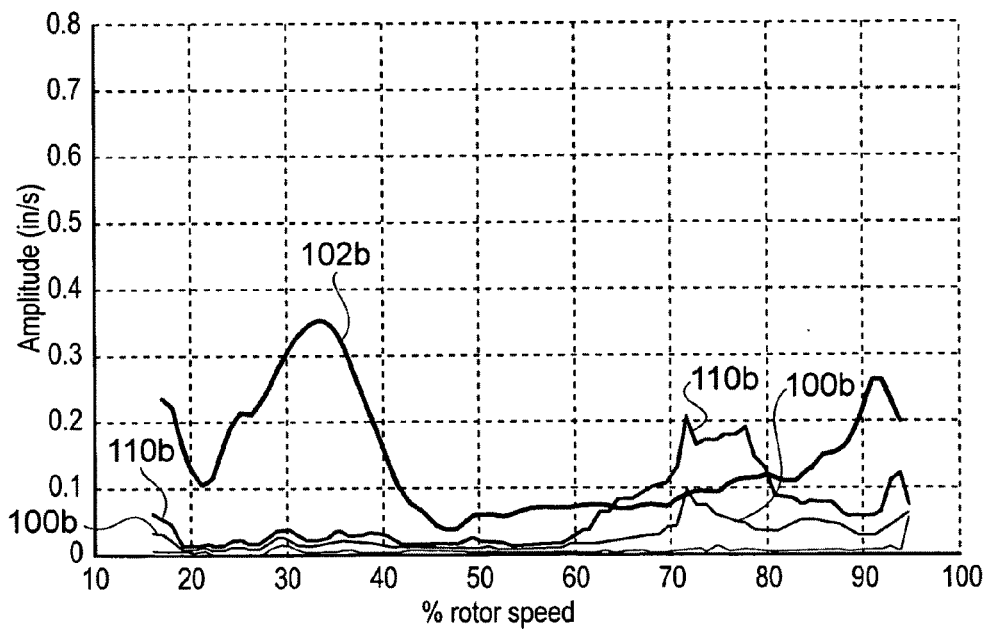
Figure 12:
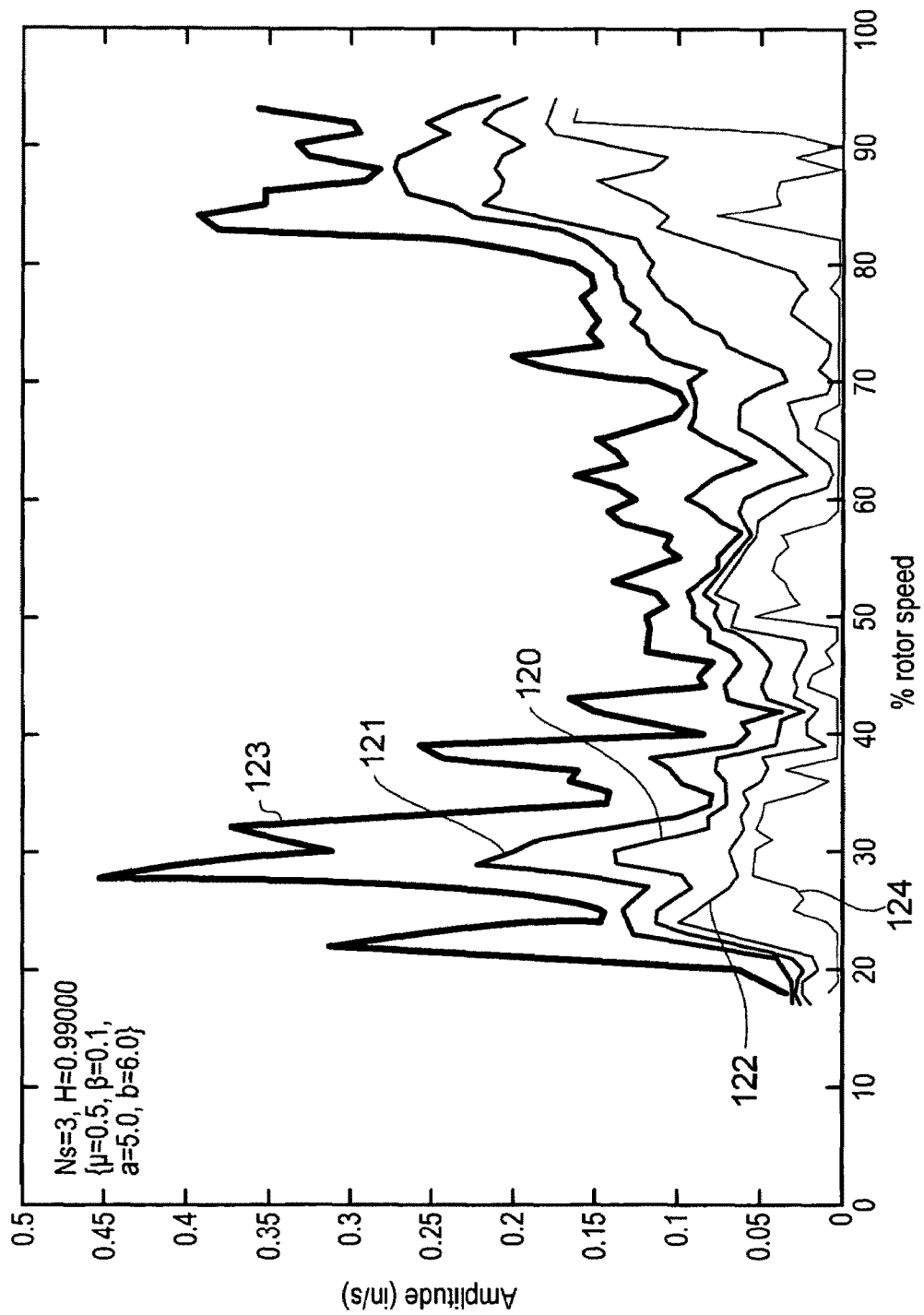

There now follow non-limiting examples of the invention with reference to the drawings of which:

FIG. 1 graphically illustrates a Gumbel Extreme Value probability Distribution (EVD) function for a variety of data sample set sizes;

FIG. 2 graphically illustrates the progression of the abnormality/novelty detection threshold defined using the Gumbel EVD of FIG. 1;

FIG. 3 schematically illustrates a novelty detector in combination with an engine being monitored thereby;

FIGS. 4a and 4b graphically illustrate frequency histograms of a data sample set (FIG. 4a) and a sample data sub-set (FIG. 4b), where the data of the sample data sub-set are drawn from the data sample set;

FIGS. 5a, 5b and 5c graphically illustrate a Normal-Gamma joint posterior probability distribution generated using the values of zero (FIG. 5a), ten (FIG. 5b) and twenty-five (FIG. 5c) measured physical parameter values;

FIG. 6 graphically illustrates a Normal-Gamma joint posterior probability distribution of the type illustrated in FIGS. 5a, 5b and 5c, together with a superimposed mesh defining 81 contiguous and equiprobable regions each containing a coordinate point corresponding to the centroid of probability mass in the region in question;

FIG. 7 graphically illustrates the selection of coordinate points illustrated in the joint posterior distribution of FIG. 6;

FIGS. 8a and 8b graphically illustrate frequency histograms of a data sample set (FIG. 8a) and a sample data sub-set (FIG. 8b), where the data of the sample data sub-set are drawn from the data sample set;

FIG. 9 graphically illustrates the development of an abnormality/novelty detection threshold calculated according to a respective one of three extreme value methods;

FIG. 10 graphically illustrates the values of multiple data sample sets relating to measurements of physical parameters of a jet engine in operation during a flight, and an associated novelty detection upper threshold calculated according to previous such measurements of the same engine during previous flights;

FIG. 11 graphically illustrates the values of multiple data sample sets relating to measurements of physical parameters of a jet engine in operation during a flight, and an associated novelty detection upper threshold calculated according to previous such measurements of the same engine during previous flights including the flight associated with FIG. 11;

FIG. 12 graphically illustrates the values of multiple data sample sets relating to measurements of physical parameters of a jet engine in operation during a flight, and an associated upper and lower novelty detection thresholds calculated according to previous such measurements of the same engine during previous flights.

In the drawings, like items are assigned like reference symbols.

The following describes an application of Extreme Value Statistics to the task of constructing a representation of normality. In examples, this is extended to incorporate a representation of uncertainty in the representation of normality, and an illustration is given of the benefits over conventional techniques in novelty detection for jet engine vibration data.

Extreme value theory (EVT) is concerned with representing the distribution of very large or very small values with respect to a generative data distribution. It may be applied to generate a useful value of the probability of observing abnormally large value with respect to a set of normal data. A corresponding value of the probability of observing an abnormally small value requires a simple modification of methodology.

FIG. 3 illustrates schematically an apparatus 10, such as an engine, monitored by a novelty detector 20 according to an example of the invention. The apparatus may be any apparatus from which measurement can be made of a physical parameter associated with the function, operation or characteristic of the apparatus. For example, the apparatus subject to monitoring may be an engine, such as an aero engine, and a physical parameter measured by the novelty detector may be a speed of rotation or vibration of a rotating or moving part of the engine. The novelty detector 20 includes a sensor 22 arranged to measure a specified physical operating parameter of the engine, such as a vibration speed, and to produce a data value representing the measurement of the physical operating parameter. The sensor 22 is operably connected, via a data transmission link 24, to an analysis means 25 arranged to analyse measurement data received from the sensor 22 and to conditionally indicate an abnormality in the measured operating characteristics of the engine 10 using received such measurement data.

The analysis means includes a data storage unit 26, which may be any suitable electronic or optical data storage apparatus suitable for retrievably storing data values (e.g. digitally) and which is arranged to receive and store therein measurement data from the sensor 22. The data storage unit is also arranged to receive data retrieval command via a command transmission link 30 and is responsive thereto to retrieve stored measurement data specified in such a command, and to output the retrieved data via an output data transmission link 28.

A computing and control means 32, such as a central processor unit of a computer or the like, is provided in the analysis means in communication with the data storage unit 26 and the sensor 22. The computing and control means is arranged to generate and issue, as and when desired, data retrieval commands to the data storage unit 26 via the command transmission link connecting it to the data storage unit, and data acquisition commands to the sensor 22 via a further command transmission link (31 and 24).

The sensor 22 is responsive to such data acquisition commands to perform a specified physical parameter measurement, and to transmit the result to the data storage unit. In alternative embodiments, the sensor 22 may be arranged to perform measurements automatically or independently of the computing and control means, and to store the acquired data in a memory storage means optionally provided in the sensor to permit transfer of that data to the data storage unit 26 as a data sample set.

In the present example, the computing and control means is arranged to issue a pre-selected number (n) of successive data acquisition commands to cause the sensor to repeat successive physical parameter measurements, such that a plurality (n) of measured physical parameter values are acquired. The data storage unit is arranged to store the plurality of values of a data sample set $X_n = \{x_1, \ldots x_n\}$.

Subsequent to accessing, or retrieving, a given data sample set $X_n$ from the data storage unit, the computing and control means is operable to select from the data sample set the two extremal values therein, that is to say, it is arranged to select the samples $x_{max} = \text{Max}(X_n)$ and $x_{min} = \text{Min}(X_n) = \text{Max}(Y_n)$, where $Y_n = \{-x_1, -x_2, \ldots, -x_n\} = -X_n$. Prior to selection of $x_{min}$, the computing and control means is arranged to reverse/invert the sign of each measured parameter value within the data sample set (without any change in magnitude) such that positive values become negative values and vice versa, thereby to produce an inverted data sample set, $Y_n$.

The computing and control means 32 is arranged to subsequently apply each of the two selected extremal values $(x_{max}, x_{min})$, separately to an extreme value probability distribution function thereby to determine a respective probability of observing a measured parameter value (inverted or otherwise) not greater than the selected extremal value in question. The computing and control means is arranged to subsequently compare such probabilities to a respective novelty threshold value representing an uppermost cumulative probability below which "normal" data value observations are assumed to fall (e.g. 0.95, or 0.99, or the like). If the comparison of a determined probability exceeds its associated novelty threshold, the computing and control means 32 is arranged to generate a command 34 for an indicator means 36 provided in the novelty detector (e.g. a visual display unit) to control the indicator means to indicate that the novelty threshold has been exceeded. The indicator means may provide an indication of novelty detection by any suitable visual indication. Alternatively, the indicator means may simply be a means for producing an alarm signal or conveying an indication of the detection of a novelty e.g. for transmission to a third party.

The following describes two alternatives to the function and operation of the computing and control means in applying to an extreme value probability distribution function, an extremal value ($x_{max}$ or $x_{min}$) selected from a data sample set $X_n$.

The first alternative is referred to herein as the maximum likelihood-extreme value theory alternative ("ML-EVT2"), whereas the second alternative is referred to herein as the "Bayesian EVT" alternative. The computing and control means may be arranged to implement either methodology.

ML-EVT2

According to this embodiment, the computing and control means 32 is arranged to define a Gumbel (Type I) extreme value distribution (EVT) of the form:

$$H(y_m) = \exp(-\exp(y_m))$$

where $$y_m = \frac{x - \mu_m}{\sigma_m}$$

having a location parameter $\mu_m$ and scale parameter $\sigma_m$ defined by:

$$\mu_m = \sqrt{2\ln(m)} - \frac{\ln(\ln(m)) + \ln(4\pi)}{2\sqrt{2\ln(m)}}$$

$$\sigma_m = \frac{1}{\sqrt{2\ln(m)}}$$

Where m is an integer value representing the notional size (i.e. the number of data values therein) of a sub-sample data set drawn or drawable from the data sample set of measured parameter values stored within the data storage unit 26. Consequently, the integer value m is less than the integer value n representing the size of the data sample set. The value of the integer m is pre-selected such that a suitably sampled such sub-sample data set of size m comprising m of the measured parameter values including the extremal value, conforms to a distribution which approximates a Gaussian distribution more closely than the distribution of the data values of such a sub-sample data set of any different size. In the present example, a suitable sub-sampling regime is the selection of the highest j (j=m) measured parameter values observed in the data sample set with the value of the integer j being adjusted by trial-and-error until a value is found which produces the sub-sample data set with samples distributed in a way which most closely approximates a Gaussian distribution as is schematically illustrated in FIGS. 4a and 4b. The integer value m is then set to this optimal value j, and this value is used to exclusively define the location and scale parameters of the EVD defined above. Thus, the size of the most Gaussian-like sub-sample data set is employed to uniquely define the EVD.

Referring to FIGS. 4a and 4b in more detail, FIG. 4a schematically represents the distribution of measured parameter values in a given data sample set. From this data sample set the top "j" data samples are selected. This involves selecting the extremal data value, the next-highest data value of the data sample set, the next-highest data sample after that one, . . . and so on until "j" successive data samples are selected. When the appropriate value of "j" has been found, the distribution of sub-sample data values within the sub-sample data set (FIG. 4b) will most closely conform to a Gaussian distribution. Of course, if this sub-sampling procedure is repeated for successive data sample sets each comprising a set of measured parameter values of the engine 10 measured independently of measurements made in acquiring any other data sample set, then the observed distribution of the accumulated sub-sample data sets will visibly display or reveal the underlying distribution (42) common to the sub-sample data sets as is schematically illustrated in FIG. 4b. In this way, an optimal integer value "j" may be refined as more data sample sets are acquired and the underlying distribution of the cumulative sub-sample data set is better revealed.

A specific example of this is illustrated in FIG. 8a and FIG. 8b. FIG. 8a shows a typical distribution of vibration data within a narrow range of vibration speed of a component of an aero engine. The distribution is bimodal and comprises data acquired over 65 independent flights of the aero engine. Thus, the data illustrated in FIG. 8a represents the distribution of vibration amplitude values for 65 independent data sample sets. From each one of the 65 independent data sample sets, the highest three vibration amplitude values observed in each data sample set were sub-sampled to produce 65 sub-sample data sets of size m=3. Combining the data in each of these 65 sub-sample data sets produced a distribution illustrated in FIG. 8b. It was found that this distribution was closer to a Gaussian distribution than was the corresponding distribution of a cumulative sub-sample data set comprised of 65 sub-sample data sets each of a different size (i.e. m not equal to 3).

Accordingly, substituting the value m=3 into the above equations defining the location and scale parameter of the Gumbel EVD, produces the result:

$$\mu_3 = \sqrt{2\ln(3)} - \frac{\ln(\ln(3)) + \ln(4\pi)}{2\sqrt{2\ln(3)}}$$

$$\sigma_m = \frac{1}{\sqrt{2\ln(3)}}$$

$\mu_3$=0.5968, and $\sigma_3$=0.6746. When the extremal value in question is a minimum value, $\mu_3$=−0.5968.

When a data sample set is acquired, and an extremal value selected therefrom, the computation and control means 32 generates the reduced variate:

$$y_m = \frac{x - \mu_m}{\sigma_m}$$

(m=3, in this case) using the predetermined values for the location and scale parameters, and applies the reduced variate to the Gumbel EVD resulting in production of a probability of observing a measured parameter of a value not exceeding the extremal value. This probability is then compared to a novelty threshold, such as P(x)=0.95, which, if exceeded, causes the computation and control means to issue a command to the indicator means 36 to indicate detection of a novelty event.

Bayesian-EVT

According to this embodiment, the computing and control means 32 is arranged to define an overall EVD being a weighted sum of Gumbel EVDs each having a location parameter Xm and a scale parameter $\sigma_m$ determined according to an estimate of the probability of those parameters ($\lambda_m$, $\sigma_m$) being the true parameters. The weight of each of the separate Gumbel EVDs in the weighted sum is also determined according to the same estimation. The estimation is generated using a plurality of measured physical parameter values from a given data sample set to recursively update a prior such estimation made using earlier/other independently acquired data sample sets containing measurement values of the physical parameter in question taken from the engine 10 via the sensor 22.

In particular, given a first data sample set, e.g. containing n measured parameter values $X_n = (x_1, \ldots, x_n)$, the computing and control means is arranged to generate a sub-sample data set containing the "j" highest data values within the data sample set, the value of "j" being pre-selected such that the underlying distribution of the elements of the sub-sample data set more closely approximates a Gaussian distribution than does the distribution of other such sub-sample data sets of a different size. Reference is made to FIGS. 4a and 4b, and FIGS. 8a and 8b, and the discussion of those figures given above. In this regard, the sub-sampling regime employed in this Bayesian-EVT embodiment is the same as that employed in the ML-EVT2 embodiment described above.

The computing and control means is arranged to use the data values of the sub-sample data set, and the integer representing its size, to calculate the following hyper-parameters:

$$u_m = \frac{\beta_0 \mu_0 + \sum_{i=1}^{m} x_i}{\beta_m}$$

$$\beta_m = \beta_0 + m.$$

$$a_m = a_0 + \frac{m}{2}$$

$$b_m = b_0 + \frac{1}{2}\left[\sum_{i=1}^{m} x_i^2 - \frac{1}{m}\left(\sum_{i=1}^{m} x_i\right)^2 + \frac{\beta_0 m}{\beta_0 + m}\left(\frac{1}{m}\sum_{i=1}^{m}(x_i - \mu_0)\right)^2\right]$$

where $a_0$, $b_0$, $\beta_0$ and $\mu_0$ are predefined constants.

The initial values of these constants ($a_0$, $b_0$, $\beta_0$ and $\mu_0$) may be a "best guess" prior to actual analysis of the system-under-test. This best guess could come from knowledge of other systems (e.g. engines) of the same type that have previously been analysed. In practice, this is just the "starting point" of the algorithm, from which it typically moves away rapidly as actual data are observed from the system-under-test.

Where the value m=j where j is preselected to be the optimal sub-sample data set size determined as discussed above to result in the most Gaussian-like sub-sample data distribution. When the second data sample set is acquired, and a second sub-sample data set of size j is obtained therefrom, the additional j data elements from the second sub-sample data set are added to the existing sums, sums-of-squares etc, in the above for hyper-parameters previously calculated using the first-sample data set above. Thus, the value "m" in the equations for the hyper-parameters $\mu_m$, $\beta_m$, $a_m$ and $b_m$ becomes m=2j. The same updating of the hyper-parameter values occurs upon acquisition of each successive data sample set (e.g. each set of measured data for a successive engine run/flight) and associated sub-sample data set of the top "j" values thereof. In general, for a succession of k data sample sets (e.g. acquired from k successive engine flights) m=k×j and each flight enables the hyper-parameters to be updated using j new sub-sample data set values.

Once the hyper-parameter values have been generated, the computation and control means is arranged to determine the position ($\mu_{ML}$, $\lambda_{ML}$) of the peak of the Normal-Gamma joint posterior distribution function:

$$p(\mu,\lambda|X)=N(\mu|\mu_m,[\beta_m\lambda]^{-1})Gam(\lambda|a_m,b_m)$$

and then:
(1) determine S (S=integer, e.g. 9 (nine) in this example, though any other integer value may be used) equiprobable samples of $\mu$ ($\mu=\mu_1, \ldots, \mu_9$) from the cumulative distribution $$P(\mu) = \frac{1}{2}\left[1 + \mathrm{erf}\left\{\sqrt{\frac{\beta_m\lambda}{2}}(\mu - \mu_m)\right\}\right]$$

such that $$P(\mu_l) - P(\mu_{l-1}) = \frac{1}{10}.$$

(2) determine S (e.g. 9 (nine) in this example, though any other integer value may be used) equiprobable samples of $\lambda(\lambda_j=\lambda_1, \ldots, \lambda_9)$ from the cumulative distribution $$P(\lambda) = 1 - \frac{\Gamma(a_m + 1/2, c_m\lambda)}{\Gamma(a_m + 1/2)}$$

Where $c_m=b_m+\beta_m(C-\mu_m)^2/2$ and C is a selected sample value $\mu_1$ chosen from one of the nine sample values ($\mu_1, \ldots, \mu_9$) derived at step (1) above such that $$P(\lambda_j) - P(\lambda_{j-1}) = \frac{1}{10}.$$

FIG. 7 schematically illustrates the method by which the computing and control means samples are given cumulative distribution $P(\mu)$ or $P(\lambda)$. The nine values of the independent variable [variable $\mu$ for $P(\mu)$; the variable $\lambda$ for $P(\lambda)$] which result in the following corresponding nine values of $P(\mu)$ or $P(\lambda)$ are chosen: $P(\mu$ or $\mu)$=0.1, 0.2, 0.3, 0.4, 0.5, 0.6, 0.7, 0.8, 0.9.

FIG. 6 graphically illustrates the 81 selected coordinate pairs ($\mu_1$, $\lambda_j$), where l=1, ..., 9; j=1, ..., 9, so determined (items 60). Each such coordinate pair corresponds to the location of centroid of probability mass of a corresponding region 62 of the Normal-Gamma function 61 and the probability mass of each such region is common to all 81 such contiguous regions.

Using the 81 selected coordinate pairs ($\mu_1$, $\lambda_j$), (i.e. 81=S×S, where S=9, though any other integer value for S may be used in other examples) the computing and control means is arranged to generate each of 81 Gumbel EVDs having a location ($\lambda_m$) and scale ($\sigma_m$) parameter define the respective coordinate values of a respective one of the 81 selected coordinate pairs ($\mu_1$, $\lambda_j$) and given by: $\mu_m=\mu_1$, $[\sigma_m]^2=[\lambda_j]^{-1}$. It is also arranged to generate an estimation $P(\theta_i|X)$ of the probability of the selected location and scale parameter values $\theta_i=(\mu_i, \lambda_j)$ by applying each of the 81 coordinate pairs to the joint posterior probability distribution function:

$$P(\theta_i|X)=p(\mu_1,\lambda_j|X)=N(\mu_1|\mu_m,[\beta_m\lambda_j]^{-1})Gam(\lambda_j|a_m,b_m)$$

This provides the respective weight of each of the 81 Gumbel EVDs of the weighted sum.

These values are then used to generate a probability $P(x|X)$ of an extremal value not exceeding the observed extremal value "x" as:

$$P(x|X) = \sum_{i=1}^{81} P(\theta_i|X)\exp(-\exp(y_m))$$

where $$y_m = \frac{x - \mu_m}{\sigma_m}$$

This generated probability is then compared by the computing and control means, to a novelty threshold (e.g. P=0.95) and an indication of abnormality/novelty is generated by the indicator means 36, by action of the computing and control means, should $P(x|X)$ exceed this threshold value.

The following examples illustrate the application of the above methods and apparatus in the analysis of vibration data measured from a modern aerospace gas-turbine engine, in which pre-cursors of engine failure in developmental flight data are identified. In the following a comparison is made with existing implementations of EVT and existing methods used by engine developers. Data for the examples described below were collected from case-mounted vibration sensors during 72 developmental flights of the aircraft engine. Flights {1 ... 65} were labelled "normal" flights by engine developers, flights {66 ... 72} were labelled "abnormal". Retrospective engine analysis showed that an engine component became loose during flight 66, resulting in eventual engine failure during flight 71, with flight 72 performed as a data-collection exercise.

At the end of each flight, a vibration signature was constructed which summarises the magnitude of engine vibration at fundamental frequencies (known as tracked orders) across a range of engine speeds. The engine speed range [0 to 100]% was subdivided into B=20 sub-ranges of equal width, and a signature thus consists of B=20 bins, each of which contains all vibration measurements that occurred in that speed sub-range during the flight. For each bin, a novelty threshold was constructed to determine the limits of "normal" data.

Existing methods for setting thresholds in vibration signatures are heuristic. Given a set of "normal" training data X with mean $\mu$, engine developers define a novelty score z(x) for test data x:

$$z(x)=(x-\mu)/(\text{Max}(X)-\mu)$$

A novelty threshold h is then defined on z(x) such that test data are classified "abnormal" if z(x)>h, where typically h=1.2.

Though the present analysis of engine vibration data was carried out retrospectively, flight-by-flight novelty detection was simulated by updating EVD, or the overall EVD, and resulting novelty thresholds, with data from each successive flight. For each method of setting thresholds, a flight n was tested against a model of normality constructed using a training set of the prior flights {1 ... n−1} considered "normal" by that method.

The formulations of EVT discussed so far have assumed that the data have a Gaussian distribution. However, FIG. 8a shows a typical distribution of vibration data within an example speed bin, which is bimodal. For each bin we can construct a new data set formed from the 3 maximum vibration amplitudes from each flight in the training set (e.g. set j=3 in FIG. 4a). This data set of maxima is approximately Gaussian (e.g. see FIG. 4b) for each speed bin, an example of which is shown in FIG. 8b in respect of jet engine vibration data, and is used for setting novelty thresholds using EVT.

Three EVT methods are compared in setting novelty thresholds (at P(x)=0.95) as follows:

ML-EVT1: the EVT method used in existing methods described above, in which m is taken to be the size of the whole data sample set.

ML-EVT2: the EVT method in which location and scale parameters are generated using only the integer value m=3 representing the size of a sub-sample data set drawn from the data sample set.

Bayesian EVT: in which a sub-sample data set comprising the 3 largest values of a data sample set are drawn from successive data sample sets in order to cumulatively update the structure of an overall EVD comprising a weighted sum of separate EVDs.

Noting that (in the data set of maxima used to construct EVT models) each flight results in a signature with 3 largest values per speed bin, ML-EVT2 and Bayesian EVT use the integer value 3 in order to estimate the expected maximum value of these 3 data, with respect to the model of normality. In this way the size of the sub-sample data (test) set is used to determine the value of this integer, not the size of the whole data (training) sample set as used previously in ML-EVT1. That is, in Bayesian EVT, the training data are used to estimate the underlying uncertainty in the estimate of "normality", while the EVT-based threshold, as determined in Bayesian EVT and ML-EVT2, depends on the number of test data being drawn from that distribution. EVT provides that estimate of the expected maximum of a set of data drawn from a distribution, and thus we use the size of the test set for constructing hyper-parameters of the EVD(s).

Each of the three methods was used to determine a novelty threshold in each of the B=20 distributions as described. A method is deemed to classify a flight signature "abnormal" if any of the B=20 bins contains "abnormal" data (i.e. vibration data that exceed the novelty threshold set by that method for that bin).

Results are shown in Table 1. Each method shows true positive (TP), false positive (FP), true negative (TN), and false negative (FN) classifications. Sensitivity (TP/TP+FN) and Positive Predictive Value (PPV=TP/TP+FP) are shown for each, being two common benchmarks used for evaluation of novelty detection methods, along with the number of the first flight classified "abnormal" by each method.

TABLE 1

Novelty detection results from test flight series

| Method | TP | FP | TN | FN | Sensitivity | PPV | EarliestAbnormal |
|---|---|---|---|---|---|---|---|
| Heuristic | 2 | 1 | 64 | 5 | 0.29 | 0.66 | 7 |
| ML-EVT1 | 1 | 3 | 62 | 6 | 0.14 | 0.25 | 2 |
| ML-EVT2 | 6 | 4 | 61 | 1 | 0.86 | 0.60 | 3 |
| Bayesian EVT | 6 | 0 | 65 | 1 | 0.86 | 1.00 | 67 |

The heuristic method has low sensitivity, caused by its dependence on the single maximum value observed in the training set.

ML-EVT1, the previously-used EVT implementation, showed very low sensitivity, combined with a poor PPV. This is due to the previously-noted behaviour in which novelty thresholds start low, when model uncertainty is high, and then increase as more data are observed. This is shown in FIG. 9, which shows the development of the novelty thresholds for all three EVT methods as more flight data is employed. Novelty thresholds set using ML-EVT1, ML-EVT2, and Bayesian EVT are shown for 72 test flights (flight number on x-axis, threshold in standard deviations [of the training set data] on y-axis) ML-EVT2 showed better sensitivity (due to generally lower novelty thresholds) but low PPV, caused by false-positive novelty detections near the beginning of the test series, when model uncertainty is high.

Bayesian EVT showed good sensitivity, detecting 6 of the 7 abnormal episodes, but with a much higher PPV than other methods. The setting of the novelty threshold to high values when model uncertainty is high (for smaller numbers of flight data) provides robustness against false-positive novelty detections. The method remains sensitive enough, through its decreasing threshold as uncertainty decreases, to detect the abnormality in the final two flights, and in four earlier flights in which pre-cursors of eventual failure were present.

FIGS. 10 and 11 illustrate an example of the output of an indicator means comprising a visual/graphical display of "normality" and "novelty". The graph is produced by the indicator means comprising the average value (100), maximum value (110) and minimum value (105) of a vibration amplitude measured in a rotor of a "Trent-900" Rolls Royce aero engine when rotating at a rotation speed falling within a respective one of 100 equal-width rotor speed value bins. The bins extend from the bin ranging from 0% to 1% of the maximum rotor speed, to the bin ranging from 99% to 100% of the maximum rotor speed—i.e. 100 bins in all each of width 1% of the maximum rotor speed value.

A novelty threshold value of P=0.999 is set individually for each one of the 100 speed bins using the Bayesian-EVT method described above and is indicated as a corresponding novelty amplitude threshold in the graph line 102 which comprises 100 separate such calculated novelty amplitude thresholds interpolated to provide a continuous novelty threshold line 102.

Thus, in respect of a given speed bin, the location of the novelty amplitude threshold is illustrated as the value of a measured amplitude $x^{(i)}$ such that, for the $i^{th}$ bin, P=0.999. If an observed maximum value 110 of a data set of vibration amplitudes, newly measured in an engine run, exceeds $x^{(i)}$ within the rotor speed range defining the $i^{th}$ bin, then the indicator means indicates this visually as the height of the maximum value graph line (110) exceeding the height of the novelty amplitude threshold 102. No such novelty event occurs in the flight from which the data measurements, producing lines 100, 105, 110, 118.

However, in a subsequent flight, a further data sample set of rotor vibration amplitudes was acquired. These data were used, according to the Bayesian-EVT method described above, to update the probability distribution function used to define the novelty amplitude thresholds 102 of FIG. 10 with the result being the updated novelty amplitude threshold 102b shown in FIG. 11. It will be noted that there is no perceptible difference in the position of the previous (102) and updated (102b) thresholds across the whole rotor speed range, illustrated that the Bayesian-EVT method has "learnt" what is a most suitable representation of "normality" in the aero engine as far as rotor vibration amplitudes are concerned. Contrast this with existing methods which would force the thresholds 102b of the subsequent flight to be higher than the thresholds 102 of the previous flight.

In the subsequent flight, the indicator means' output illustrates that a novelty event occurred in respect of rotor speeds from 64% to 80% of the maximum rotor speed. Subsequent analysis of the Trent-900 aero engine revealed that a rotor blade had been damaged in the subsequent flight due, probably, to a heavy landing of the aircraft. The novelty is indicated by the line 110b (comprised of interpolated points representing a maximum amplitude within a data sample set of a respective speed bin) crossing the updated novelty amplitude threshold 102b. Lines 100b and 105b represent average and maximum values, respectively, of data sample sets acquired in the subsequent flight with respect to each of the 100 speed bins.

FIG. 12 graphically illustrates a similar such graph produced by the indicator means in respect of aero engine flight data sample sets, and comprising a "maximum" novelty amplitude threshold 123, as well as a "minimum" novelty amplitude threshold 124, defined using the same data as that defining the maximum threshold, but in sign-inverted form as described above (i.e. the required maximum values of the sign-inverted data ($Z=\{z_1, \ldots, z_j\}$, where $z_i=-x_i$) being employed to calculate a novelty threshold for the minimum of the data sample set $X=\{x_1, \ldots, x_j\}$ such that $Max[z_1, \ldots z_j]=Min[x_1, \ldots x_j]$).

Average observed values (120), maximum observed values (121) and minimum observed values (122) are indicated graphically by the indicator means and show that no novelty event occurred during the engine run producing the data sample sets in question. Note that the novelty threshold in respect of the extremal novelty thresholds (123,124) of FIG. 12 are defined using a probability P=0.99. The novelty thresholds (102, 102b, 123, 124) illustrated in each of FIGS. 10, 11 and 12 were generated using the following values of the constants $a_0$, $b_0$, $\beta_0$ and $\mu_0$ in the hyper-parameters constructed by the computing and control means:

$a_0=5.0$
$b_0=6.0$
$\beta_0=0.1$
$\mu_0=0.5$

Also note that the size "S×S" of the number of selected coordinate parameter pairs ($\mu_1, \lambda_j$) sampled from the joint posterior distribution (see FIG. 6) employed in generating the minimum and maximum novelty thresholds (124, 123) illustrated in FIG. 12 was S×S=9 (i.e. S=3). However, the size "S×S" of the number of selected coordinate parameter pairs ($\mu_1, \lambda_j$) sampled from the joint posterior distribution employed in generating the novelty thresholds (102, 102b) illustrated in FIGS. 10 and 11 was S×S=25 (i.e. S=5). The size "j" of each sub-sample data set employed in generating the hyper-parameter values used in generating the minimum and maximum novelty thresholds (124, 123, 102, 102b) illustrated in FIGS. 10, 11 and 12 was j=3.

The present examples describe existing methods in the field of novelty detection using extreme value statistics, and illustrate its disadvantages. These disadvantages are due to the exclusion of parameter uncertainty in its formulation, and to inappropriate use of the integer (m) parameter used to construct hyper-parameters of an EVD. The present examples include novelty detection applied within a Bayesian learning framework, to better represent uncertainty in a model of normality. Preliminary studies using jet engine vibration data indicate that, existing methods can be altered to improve their performance, and a Bayesian extension provides added robustness desirable in a practical system of novelty detection, while still correctly detecting "abnormal" events that are pre-cursors of eventual system failure.

The present invention may provide a robust method for automatically setting novelty thresholds. As more normal data are learned (e.g. as an aircraft completes more flights), one becomes more certain in the assumed model of normality, and novelty thresholds change accordingly. Robust alarms are provided, with minimal and quantified numbers of false alerts: by modeling uncertainty, there is provided a robust protection mechanism against false-positive activations. The re-use of engineering knowledge is a key driving factor for engineers, as they are faced with retraining all feature detectors for each new engine class, and often for each new engine within that engine class. The present invention may provide a system which allows engineering knowledge gained from previous engine builds to be re-used to provide a "prior knowledge" model, which is then refined as the engine-under-test completes more flights. This approach also allows the model to be actively used for monitoring much earlier in the process (e.g. from first flight).

Currently embodiments described above apply the invention to aero engine vibration and performance data. The invention is applicable to setting novelty thresholds in any type of numeric based data. For example, it is applicable to numerically based representations of any technical system. The range of potential applications is diverse and could include for example, monitoring manufacturing processes, building structural health monitoring, medical health monitoring.

It will be appreciated that the above examples are not intended to be limiting, and that variants, modifications and alternatives of the above examples, such as would be readily apparent to the skilled person are encompassed within the invention.

The invention claimed is:

1. A method for detecting an abnormality in an apparatus or system including:
   providing a data sample set comprising n values of a measured physical parameter associated with the apparatus or system generated by repeating a measurement of the physical parameter n times;
   selecting an extremal measured parameter value from amongst the data sample set;
   determining a probability of observing the selected parameter value by applying the selected parameter value to an extreme value probability distribution function having a location parameter and a scale parameter wherein the value of the location parameter and the value of the scale parameter are each constructed using an integer value m (e.g. notionally representing the size of a sub-sample data set comprising m of said measured parameter values) in which m is less than n (i.e. m<n);
   conditionally indicating that the selected parameter value is abnormal according to the value of said probability.

2. A method according to claim 1 in which the measured parameter values of a sub-sample data set of size m comprising m of said measured parameter values, and including the extremal value, conform to a distribution which approximates a Gaussian distribution more closely than the distribution of the values of such a sub-sample data set of a different size.

3. A method according to claim 1 in which each of the measured parameter values of the sub-sample data set is greater in value than any measured parameter value of the data sample set not also comprised in the sub-sample data set.

4. A method according to claim 1 in which the extreme value probability distribution function is a Gumbel (Type I) distribution.

5. A method according to claim 1 in which the extremal value is the maximum value of the data sample set.

6. A method according to claim 1 in which the extremal value is the minimum value of the data sample set.

7. A method according to claim 1 in which the integer value (m) is a value selected from following integers: 3 to 10.

8. A method according to claim 1 in which the value (m) is 3 (m=3).

9. A method according to claim 1 including constructing the location parameter ($\mu m$) of the extreme value probability distribution function with a magnitude given according to the following equation:

$$\mu_m = \sqrt{2\ln(m)} - \frac{\ln(\ln(m)) + \ln(4\pi)}{2\sqrt{2\ln(m)}}.$$

10. A method according to claim 1 including constructing the scale parameter ($\sigma_m$) of the extreme value probability distribution function according to the following equation:

$$\sigma_m = \frac{1}{\sqrt{2\ln(m)}}.$$

11. A method according to claim 1 including repeating n times a measurement of a physical parameter associated with the apparatus of system thereby to generate said data sample set comprising said n measured parameter values.

12. A method for detecting an abnormality in an apparatus or system including:
   providing a data sample set comprising a plurality of values of a measured physical parameter associated with the apparatus or system generated by repeating a measurement of the physical parameter a plurality of times;
   selecting an extremal measured parameter value from amongst the sample set;
   determining a probability of observing the selected parameter value by applying the selected parameter value to a probability distribution function comprising a weighted sum of a plurality of extreme value probability distribution functions each having a location parameter and a scale parameter wherein the value of the location parameter and the value of the scale parameter are determined according to an estimation of the probability thereof;
   conditionally indicating that the selected parameter value is abnormal according to the value of said probability of observing the selected parameter value.

13. A method according to claim 12 including generating the estimation using a plurality of measured physical parameter values from the data sample set to recursively update a prior said estimation.

14. A method according to claim 12 including generating the estimation using a plurality of measured physical parameter values from another data sample set which is independent of said data sample set and which comprises a plurality of values of said physical parameter generated by repeating said measurement of said physical parameter a corresponding plurality of times.

15. A method according to claim 12 in which the value of the weight associated with a given extreme value probability distribution function in said weighted sum is determined according to the estimation.

16. A method according to claim 12 including generating a joint posterior probability distribution function comprising the product of a first component probability distribution function for the value of the location parameter, and a second component probability distribution function for the value of the scale parameter, and generating said estimation using the joint posterior probability distribution function.

17. A method according to claim 16 including selecting coordinates of a point in the coordinate space of the random variables of the joint posterior probability distribution function, the coordinates being selected from amongst a predetermined finite plurality of different such coordinates surrounding the coordinates corresponding to the location of the peak of the joint posterior probability distribution function, and using the value of the selected coordinates to determine the value of a location parameter and the value of a scale parameter of a said extreme value probability distribution function.

18. A method according to claim 17 including defining a plurality of separate regions in said coordinate space having a common associated probability mass according to the joint posterior probability distribution function within that region, wherein a given said selected coordinates are selected to be the coordinates of the centroid of probability mass in a given said region.

19. A method according to claim 18 in which neighbouring said regions are contiguous.

20. A method according to claim 16 including selecting a plurality of the measured parameter values from amongst the data sample set and generating a value for a hyper-parameter of the joint posterior probability distribution function using the measured values so selected.

21. A method according to claim 16 including generating a value for a hyper-parameter of the joint posterior probability distribution function using an integer value (j) representing the size of a sample data set comprising j of the measured parameter values of the data sample set.

22. A method according to claim 21 in which the integer value j is less than the integer value n (i.e. j<n) representing the size of the data sample set, and the sample data set is a sub-sample data set.

23. A method according to claim 21 including generating the value of each hyper-parameter using the integer value j.

24. A method according to claim 16 in which a hyper-parameter of the joint posterior probability distribution function is the value of the mean of the first component probability distribution function, the method including generating a value of said mean using the values of a plurality of measured parameter values selected from amongst the data sample set.

25. A method according to claim 16 in which a hyper-parameter of the joint posterior probability distribution function is the value of the scale parameter of the second component probability distribution function, the method including generating a value of the scale parameter of the second component probability distribution function using the values of a plurality of measured parameter values selected from amongst the data sample set.

26. A method according to claim 16 wherein second component probability distribution function is a Gamma probability distribution function and the first component probability distribution function is a Gaussian probability distribution function the value of the variance of which is determined according to a value(s) of the scale parameter (A) of the joint posterior probability distribution function.

27. A method according to claim 26 in which hyper-parameters of the joint posterior probability distribution include the mean and variance of the first component probability distribution function, the method including generating the mean ($\mu_m$) and variance ($[\sigma_m]^2$) of the first component probability distribution function using m (m=integer) measured parameter values ($x_i$; i=1, . . . , m) according to the following equations in which $\beta_0$ and $\mu_0$ are predefined constants:

$$\mu_m = \frac{\beta_0 \mu_0 + \sum_{i=1}^{m} x_i}{\beta_m}, \text{ and}$$

$$\sigma_m^2 = (\beta_m \lambda)^{-1}$$

where $\beta_m = \beta_0 + m$.

28. A method according to claim 26 in which hyper-parameters of the joint posterior probability distribution include the shape and scale parameters of the second component probability distribution function the method including generating the shape hyper-parameter value ($a_m$) and scale hyper-parameter value ($b_m$) of the second component probability distribution function using m (m=integer) measured parameter values ($x_i$; i=1, . . . , m) according to the following equations in which $a_0$, $b_0$, $\beta_0$ and $\mu_0$ are predefined constants:

$$a_m = a_0 + \frac{m}{2}$$

$$b_m = b_0 + \frac{1}{2}\left[\sum_{i=1}^{m} x_i^2 - \frac{1}{m}\left(\sum_{i=1}^{m} x_i\right)^2 + \frac{\beta_0 m}{\beta_0 + m}\left(\frac{1}{m}\sum_{i=1}^{m}(x_i - \mu_0)\right)^2\right].$$

29. A method according to claim 22 in which the sub-sample data set includes the extremal value and the distribution of the j measured parameter values thereof approximates a Gaussian distribution more closely than the distribution of the values of such a sub-sample data set of a different size.

30. A method according to claim 22 in which each of the measured parameter values of the sub-sample data set is greater in value than any measured parameter value of the data sample set not also comprised in the sub-sample data set.

31. A method according to claim 12 in which the extreme value probability distribution function is a Gumbel (Type I) distribution.

32. A method according to claim 12 in which the extremal value is the maximum value of the data sample set.

33. A method according to claim 12 in which the extremal value is the minimum value of the data sample set.

34. A method according to claim 22 in which the value (j) of the size of the sub-sample data-set is a value selected from following integers: 3 to 10.

35. A method according to claim 22 in which the value (j) of the size of the sub-sample data set is 3, or 4 or 5 (j=3, or j=4, or j=5).

36. A method according to claim 12 including repeating a plurality of times a measurement of a physical parameter associated with the apparatus or system thereby to generate said data sample set comprising said plurality of measured parameter values.

37. Apparatus for detecting an abnormality in an apparatus or system including:
  data acquisition means for acquiring a data sample set comprising n (n=integer) values of a measured physical parameter associated with the apparatus or system generated by repeating a measurement of the physical parameter n times;
  selector means for selecting an extremal measured parameter value from amongst the data sample set;
  calculation means for determining a probability of observing the selected parameter value by applying the selected parameter value to an extreme value probability distribution function having a location parameter and a scale parameter wherein the value of the location parameter and the value of the scale parameter are each constructed using an integer value m (e.g. notionally representing the size of a sub-sample data set comprising m of said measured parameter values) in which m is less than n (i.e. m<n);
  indicator means for conditionally indicating that the selected parameter value is abnormal according to the value of said probability.

38. Apparatus according to claim 37 in which the measured parameter values of a sub-sample data set of size m comprising m of said measured parameter values, including the extremal value, conform to a distribution which approximates a Gaussian distribution more closely than the distribution of the values of such a sub-sample data set of a different size.

39. Apparatus according to claim 37 in which each of the measured parameter values of the sub-sample data set is greater in value than any measured parameter value of the data sample set not also comprised in the sub-sample data set.

40. Apparatus according to claim 37 in which the extreme value probability distribution function is a Gumbel (Type I) distribution.

41. Apparatus according to claim 37 in which the extremal value is the maximum value of the data sample set.

42. Apparatus according to claim 37 in which the extremal value is the minimum value of the data sample set.

43. Apparatus according to claim 37 in which the integer value (m) is a value selected from following integers: 3 to 10.

44. Apparatus according to claim 37 in which the integer value (m) is 3, or 4, or 5 (m=3, or m=4, or m=5).

45. Apparatus according to claim 37 in which the calculation means is arranged to construct the location parameter ($\mu_m$) of the extreme value probability distribution function with a magnitude given according to the following equation:

$$\mu_m = \sqrt{2\ln(m)} - \frac{\ln(\ln(m)) + \ln(4\pi)}{2\sqrt{2\ln(m)}}.$$

46. Apparatus according to claim 37 in which the calculation means is arranged to construct the scale parameter ($\sigma_m$) of the extreme value probability distribution function according to the following equation:

$$\sigma_m = \frac{1}{\sqrt{2\ln(m)}}.$$

47. Apparatus according to claim 37 in which the data acquisition means is arranged to repeating n times a measurement of a physical parameter associated with the apparatus of system thereby to generate said data sample set comprising said n measured parameter values.

48. Apparatus for detecting an abnormality in an apparatus or system including:
 data acquisition means for acquiring a data sample set comprising a plurality of values of a measured physical parameter associated with the apparatus or system generated by repeating a measurement of the physical parameter a plurality of times;
 selector means for selecting an extremal measured parameter value from amongst the sample set;
 calculation means for determining a probability of observing the selected parameter value by applying the selected parameter value to a probability distribution function comprising a weighted sum of a plurality of extreme value probability distribution functions each having a location parameter and a scale parameter wherein the value of the location parameter and the value of the scale parameter are determined according to an estimation of the probability thereof;
 indicator means for conditionally indicating that the selected parameter value is abnormal according to the value of said probability of observing the selected parameter value.

49. Apparatus according to claim 48 in which the calculation means is arranged to generate the estimation using a plurality of measured physical parameter values from the data sample set to recursively update a prior said estimation.

50. Apparatus according to claim 48 in which the calculation means is arranged to generate the estimation using a plurality of measured physical parameter values from another data sample set which is independent of said data sample set and which comprises a plurality of values of said physical parameter generated by repeating said measurement of said physical parameter a corresponding plurality of times.

51. Apparatus according to claim 48 in which the calculation means is arranged to determine the value of the weight associated with a given extreme value probability distribution function in said weighted sum according to the estimation.

52. Apparatus according to claim 48 in which the calculation means is arranged to generate the estimation using a joint posterior probability distribution function comprising the product of a first component probability distribution function for the value of the location parameter, and a second component probability distribution function for the value of the scale parameter.

53. Apparatus according to claim 52 in which the calculation means is arranged to select coordinates of a point in the coordinate space of the random variables of the joint posterior probability distribution function, the coordinates being selected from amongst a predetermined finite plurality of different such coordinates surrounding the coordinates corresponding to the location of the peak of the joint posterior probability distribution function, and to use the value of the selected coordinates to determine the value of a location parameter and the value of a scale parameter of a said extreme value probability distribution function.

54. Apparatus according to claim 53 in which the calculation means is arranged to define a plurality of separate regions in said coordinate space having a common associated probability mass according to the joint posterior probability distribution function within that region, to determine the centroid of probability mass within each region and wherein a given said selected coordinates are selected to be the coordinates of the centroid of probability mass in a given said region.

55. Apparatus according to claim 54 in which neighbouring said regions are contiguous.

56. Apparatus according to claim 52 in which the calculation means is arranged to select a plurality of the measured parameter values from amongst the data sample set and to generate a value for a hyper-parameter of the joint posterior probability distribution function using the measured values so selected.

57. Apparatus according to claim 48 in which the calculation means is arranged to generate a value for a hyper-parameter of the joint posterior probability distribution function using an integer value (j) representing the size of a sample data set comprising j of said n measured parameter values.

58. Apparatus according to claim 57 in which the integer value j is less than the integer value n (i.e. j<n) representing the number of measured parameter values comprised in the data sample set such that the sample data set is a sub-sample data set.

59. Apparatus according to claim 57 in which the calculation means is arranged to generate the value of each hyper-parameter using the integer value j.

60. Apparatus according to claim 42 in which a hyper-parameter of the joint posterior probability distribution function is the value of the mean of the first component probability distribution function, the calculation means being arranged to generate a value of said mean using the values of a plurality of measured parameter values selected from amongst the data sample set.

61. Apparatus according to claim 42 in which a hyper-parameter of the joint posterior probability distribution function is the value of the scale parameter of the second component probability distribution function, the calculation means be arranged to generate a value of the scale parameter of the second component probability distribution function using the values of a plurality of measured parameter values selected from amongst the data sample set.

62. Apparatus according to claim 48 wherein second component probability distribution function is a Gamma probability distribution function and the first component probability distribution function is a Gaussian probability distribution function the value of the variance of which the calculation means is arranged to determine according to a value(s) of the scale parameter (A) of the joint posterior probability distribution function.

63. Apparatus according to claim 48 in which hyper-parameters of the joint posterior probability distribution include the mean and variance of the first component probability distribution function, the calculation means being arranged to generate the mean ($\mu_m$) and variance ($[\sigma_m]^2$) of the first component probability distribution function using m (m=integer) measured parameter values ($x_i$; i=1, ..., m) of the data sample set according to the following equations in which ($\beta_0$ and $\mu_0$ are predefined constants:

$$\mu_m = \frac{\beta_0\mu_0 + \sum_{i=1}^{m} x_i}{\beta_m}, \text{ and}$$

$$\sigma_m^2 = (\beta_m\lambda)^{-1}$$

where $\beta_m = \beta_0 + m$.

64. Apparatus according to claim 62 in which hyper-parameters of the joint posterior probability distribution include the shape and scale parameters of the second component probability distribution function the calculation means being arranged to generate the shape hyper-parameter value ($a_m$) and scale hyper-parameter value ($b_m$) of the second component probability distribution function using m (m=integer) measured parameter values ($x_i$; i=1, ..., m) of the data sample set according to the following equations in which $a_0$, $b_0$, $\beta$ and uo are predefined constants:

$$a_m = a_0 + \frac{m}{2}$$

$$b_m = b_0 + \frac{1}{2}\left[\sum_{i=1}^{m} x_i^2 - \frac{1}{m}\left(\sum_{i=1}^{m} x_i\right)^2 + \frac{\beta_0 m}{\beta_0 + m}\left(\frac{1}{m}\sum_{i=1}^{m}(x_i - \mu_0)\right)^2\right].$$

65. Apparatus according to claim 58 in which the sub-sample data set includes the extremal value and the distribution of the j measured parameter values thereof approximates a Gaussian distribution more closely than the distribution of the values of such a sub-sample data set of a different size.

66. Apparatus according to claim 58 in which each of the measured parameter values of the sub-sample data set is greater in value than any measured parameter value of the data sample set not also comprised in the sub-sample data set.

67. Apparatus according to claim 48 in which the extreme value probability distribution function is a Gumbel (Type I) distribution.

68. Apparatus according to claim 48 in which the extremal value is the maximum value of the data sample set.

69. Apparatus according to claim 48 in which the extremal value is the minimum value of the data sample set.

70. Apparatus according to claim 58 in which the value (j) of the size of the sub-sample data-set is a value selected from following integers: 3 to 10.

71. Apparatus according to claim 58 in which the value (j) of the size of the sub-sample data set is 3, or 4 or 5 (j=3, or j=4, or j=5).

72. Apparatus according to claim 48 including repeating a plurality of times a measurement of a physical parameter associated with the apparatus or system thereby to generate said data sample set comprising said plurality of measured parameter values.

73. Apparatus according to claim 37 in which the calculation means is a computer means.

74. Apparatus according to claim 37 in which the indicator means is arranged to provide a visual said conditional indication.

75. Apparatus according to claim 37 in which the data acquisition means includes a data storage means arranged to receive data and to retrievably store received data.

76. Apparatus according to claim 37 in which the data acquisition means includes data measurement means arranged to measure values of said physical parameter.

77. A detector for detecting an abnormality in an apparatus or system including an apparatus according to claim 37.

78. An engine in combination with a detector according to claim 77 arranged to detect an abnormality in operating characteristics of the engine.

79. A computer-implemented method according to claim 1.

80. A computer means containing computer program instructions executable thereon to implement the method according to claim 1.

81. A non-transitory computer readable medium containing computer program instructions executable thereon to implement the method according to claim 1.

82. A method for detecting an abnormality in an apparatus or system utilizing a computer system according to the method of claim 1.

* * * * *